(12) United States Patent
Masuko

(10) Patent No.: US 9,697,282 B2
(45) Date of Patent: Jul. 4, 2017

(54) SEARCH APPARATUS, SEARCH METHOD, SEARCH PROGRAM, AND RECORDING MEDIUM

(75) Inventor: Soh Masuko, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 396 days.

(21) Appl. No.: 14/360,184

(22) PCT Filed: Jul. 31, 2012

(86) PCT No.: PCT/JP2012/069401
§ 371 (c)(1),
(2), (4) Date: May 22, 2014

(87) PCT Pub. No.: WO2013/077029
PCT Pub. Date: May 30, 2013

(65) Prior Publication Data
US 2015/0006570 A1    Jan. 1, 2015

(30) Foreign Application Priority Data
Nov. 24, 2011 (JP) .................................. 2011-256532

(51) Int. Cl.
*G06F 17/30* (2006.01)

(52) U.S. Cl.
CPC .. *G06F 17/30864* (2013.01); *G06F 17/30424* (2013.01); *G06F 17/30722* (2013.01)

(58) Field of Classification Search
CPC ......... G06F 17/30424; G06F 17/30442; G06F 17/30448; G06F 17/30454; G06F 17/30864; G06F 17/30722
See application file for complete search history.

(56) References Cited

U.S. PATENT DOCUMENTS 6,247,009 B1 * 6/2001 Shiiyama .......... G06F 17/30265
                                                        707/999.003
7,509,314 B2 * 3/2009 Hamaguchi ....... G06F 17/30011
                                                        707/999.003
(Continued)

FOREIGN PATENT DOCUMENTS

JP          5-89172 A       4/1993
JP      H05-250411 A       9/1993
(Continued)

OTHER PUBLICATIONS

Translation of International Preliminary Report on Patentability dated Jun. 5, 2014 issued in Patent Application No. PCT/JP2012/069401.
(Continued)

*Primary Examiner* — Ashish K Thomas
*Assistant Examiner* — Jedidiah Ferrer
(74) *Attorney, Agent, or Firm* — Sughrue Mion, PLLC

(57) ABSTRACT

Even when a user does not perform an operation to specify a division of attribute, a search condition for an attribute of a division desired by the user can be specified. A search apparatus includes a first determination unit that, for each of a plurality of input words input by a user in one input area in which at least keywords can be input, determines based on an input words whether or not the input word is a first attribute word representing a content of an attribute of a predetermined first division of a plurality of divisions of attributes had by a search object, and a search unit that searches for a search object by using a content, as a search condition of attribute of the first division, represented by the input word which is determined to be the first attribute word by the first determination unit.

13 Claims, 15 Drawing Sheets

(56) References Cited

U.S. PATENT DOCUMENTS

| | | | |
|---|---|---|---|
| 8,577,907 B1* | 11/2013 | Singhal | G06F 17/3064 |
| | | | 707/759 |
| 2003/0225756 A1* | 12/2003 | Liu | G06F 17/30643 |
| | | | 707/999.003 |
| 2005/0038866 A1 | 2/2005 | Noguchi et al. | |
| 2007/0168346 A1* | 7/2007 | Markanthony | G06F 17/30433 |
| | | | 707/999.006 |
| 2008/0262945 A1* | 10/2008 | Clark | G06F 17/30917 |
| | | | 707/999.005 |
| 2009/0094224 A1* | 4/2009 | Ricket | G06F 17/30864 |
| | | | 707/999.005 |
| 2009/0144262 A1* | 6/2009 | White | G06F 17/30389 |
| | | | 707/999.005 |
| 2009/0150354 A1 | 6/2009 | Kawauchi | |
| 2012/0254063 A1* | 10/2012 | Ritterman | G06Q 40/06 |
| | | | 705/36 R |
| 2013/0103662 A1* | 4/2013 | Epstein | G06F 17/30654 |
| | | | 707/706 |
| 2013/0246405 A1* | 9/2013 | Annau | G06F 17/30864 |
| | | | 707/723 |

FOREIGN PATENT DOCUMENTS

| | | | |
|---|---|---|---|
| JP | 2008-243033 A | 10/2008 | |
| JP | 2009-140316 A | 6/2009 | |
| JP | 2010-277200 A | 12/2010 | |
| WO | 03/042869 A1 | 5/2003 | |
| WO | WO 2012/058690 A2 * | 5/2012 | G06F 17/3053 |

OTHER PUBLICATIONS

International Search Report for PCT/JP2012/069401 dated Aug. 28, 2012.

Written Opinion of PCT/JP2012/069401 dated Aug. 28, 2012.

* cited by examiner

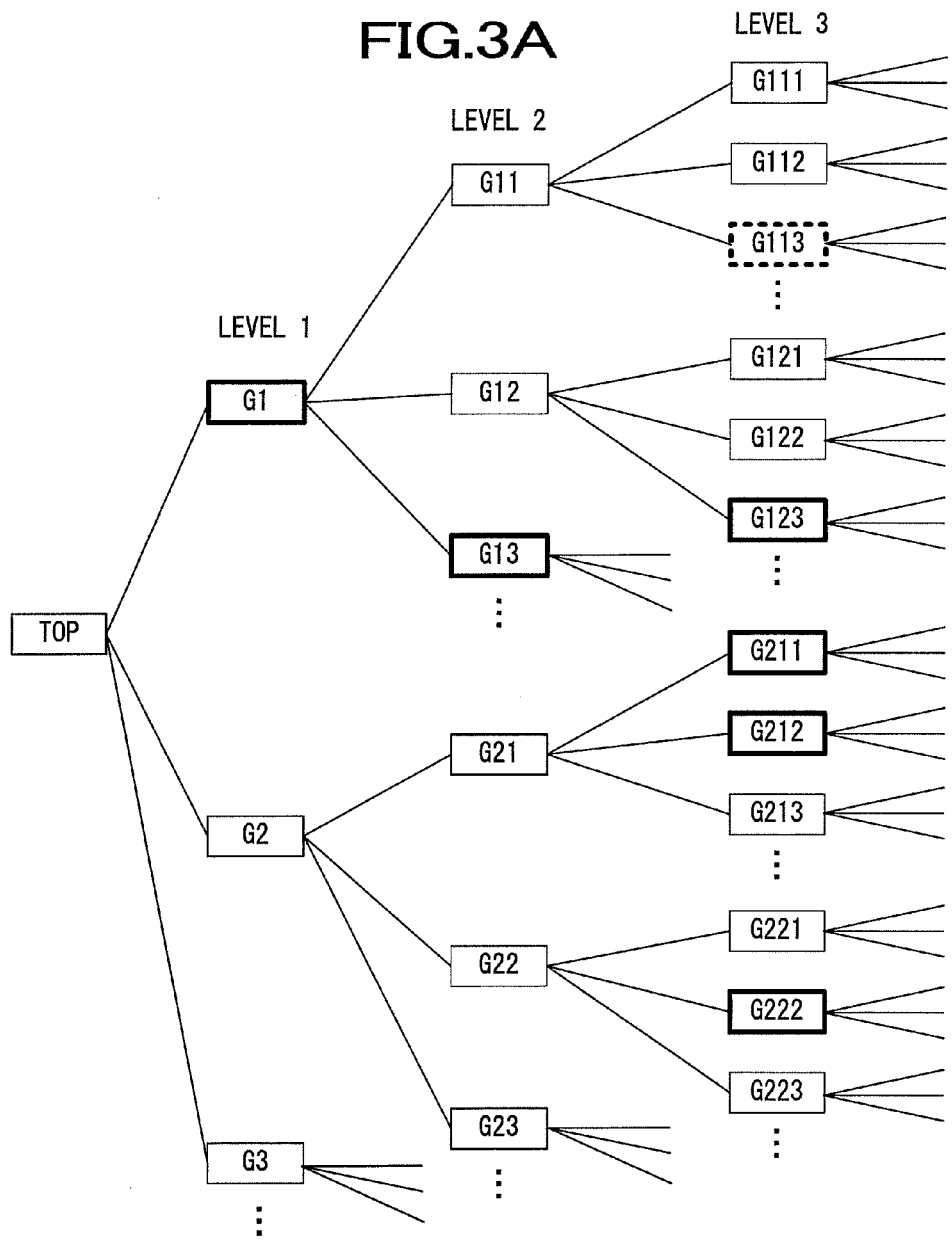
FIG.3A
FIG.3B
"G1　G13　G113を除く　G211　G212　G222"
FIG.3C
((−G113+G13) *G1) + ( (G211+G212) +G222)

FIG.4A

"コシヒカリ AAA産を除く ×××　2000円〜5000円"
　　　parent　child

「デジタルカメラ　A社　B社」1万円未満
　parent　　　siblings
　　　　　　　childs

SEARCH KEYWORD
デジタルカメラ　A社　B社　1万円未満　[SEARCH]

1ST ITEM TO 10TH ITEM   NEXT 10 ITEMS

SEARCH RESULT OF "デジタルカメラ", "A社", AND PRICE 10000 YEN OR LESS

| PHOTO | SALE ITEM NAME | PRICE | SHOP NAME |
|---|---|---|---|
|  | ITEM A1 | XXXX YEN | SHOP a1 |
|  | ITEM A2 | XXXX円 | SHOP a2 |
|  | ITEM A3 | XXXX円 | SHOP a3 |
|  | ITEM A4 | XXXX円 | SHOP a4 |
|  | ITEM A5 | XXXX円 | SHOP a5 |
|  | ITEM A6 | XXXX円 | SHOP a6 |
|  | ITEM A7 | XXXX円 | SHOP a7 |
|  | ITEM A8 | XXXX円 | SHOP a8 |
|  | ITEM A9 | XXXX円 | SHOP a9 |
|  | ITEM A10 | XXXX円 | SHOP a10 |

SEARCH RESULT OF "デジタルカメラ", "B社", AND PRICE 10000 YEN OR LESS

| PHOTO | SALE ITEM NAME | PRICE | SHOP NAME |
|---|---|---|---|
|  | ITEM B1 | XXXX円 | SHOP b1 |
|  | ITEM B2 | XXXX円 | SHOP b2 |
|  | ITEM B3 | XXXX円 | SHOP b3 |
|  | ITEM B4 | XXXX円 | SHOP b4 |
|  | ITEM B5 | XXXX円 | SHOP b5 |
|  | ITEM B6 | XXXX円 | SHOP b6 |
|  | ITEM B7 | XXXX円 | SHOP b7 |
|  | ITEM B8 | XXXX円 | SHOP b8 |
|  | ITEM B9 | XXXX円 | SHOP b9 |
|  | ITEM B10 | XXXX円 | SHOP b10 |

FIG.7A
MEMBER INFORMATION DB 12a

| USER ID |
|---|
| PASSWORD |
| NICKNAME |
| NAME |
| DATE OF BIRTH |
| GENDER |
| POSTAL CODE |
| ADDRESS |
| PHONE NUMBER |
| EMAIL ADDRESS |
| ... |

FIG.7B
CATEGORY INFORMATION DB 12b

| CATEGORY ID |
|---|
| CATEGORY NAME |
| LEVEL |
| PARENT CATEGORY ID |
| CHILD CATEGORY ID LIST |

FIG.7C
SALE ITEM INFORMATION DB 12c

| SALE ITEM ID |
|---|
| SHOP ID |
| PRODUCT CODE |
| CATEGORY ID |
| SALE ITEM NAME |
| SALE ITEM IMAGE URL |
| SALE ITEM DESCRIPTION |
| SALE ITEM PRICE |
| ... |

FIG.7D
EXCLUSION SPECIFICATION WORD DB 12d

| EXCLUSION SPECIFICATION WORD |
|---|
| "除く" |
| "以外" |
| "含まない" |
| "除外" |
| ... |

FIG.7E
UNIT WORD DB 12d

| UNIT WORD | ATTRIBUTE LABEL |
|---|---|
| "円" | pr |
| ... | ... |

FIG.7F
RANGE SPECIFICATION WORD DB 12f

| RANGE SPECIFICATION WORD | ADDITIONAL CONDITION LABEL |
|---|---|
| "以上" | mn |
| "以下" | mx |
| "より高い" | gt |
| "より安い" | lt |
| "未満" | lt |
| "-" | mn;mx |
| ... | ... |

SEARCH APPARATUS, SEARCH METHOD, SEARCH PROGRAM, AND RECORDING MEDIUM

CROSS REFERENCE TO RELATED APPLICATIONS

This application is a National Stage of International Application No. PCT/JP2012/069401 filed Jul. 31, 2012, claiming priority based on Japanese Patent Application No. 2011-256532, filed Nov. 24, 2011, the contents of all of which are incorporated herein by reference in their entirety.

TECHNICAL FIELD

The present invention relates to a technical field of a search apparatus and a search method which search for search objects by using words input by a user.

BACKGROUND ART

Conventionally, search apparatus is known which performs a search using keywords input by a user in an input field in which keywords are input. Examples of an object to be searched for by the search apparatus includes a web page, an item for sale, and a service. Hereinafter, an object to be searched for is referred to as a "search object". In general, a search object may have some attributes. The attributes of a search object are classified into a plurality of divisions. When the search object is an item for sale, examples of an attribute's division include a price, a category, and the like. A user may want to specify a search condition to an attribute of a certain division. Here, even when the user inputs a word representing a content of the attribute that the user wants to specify as a search condition in the input field in which keywords are input, a search result expected by the user may not be obtained. For example, it is assumed that the user wants to search for items for sale whose prices are 1000 yen or less. So, if the user inputs "1000 円以下" ("1000 yen or less") that represents an amount of money as a content of the price, for example, it is possible to find by keyword search an item for sale whose text describing the item for sale includes "1000円以下". However, the price of the found item for sale is not necessarily 1000 yen or less. Therefore, there is a method which displays, for each attribute's division, a widget on a screen for specifying a content of an attribute and searches for search objects having an attribute corresponding to a content specified by user's operation of the widget.

Here, Patent Literature 1 discloses a technique related to specifying a content for each attribute's division. Patent Literature 1 describes that a support device forms detailed information and/or detailed condition for each category and/or requirement included in provided information found by a search engine based on a keyword input in an input form at a user terminal, transmits to the user terminal a web page including a list box for selecting a word, as a re-search keyword, associated with the detailed information and/or the detailed condition associated with each requirement, and causes the search engine to re-search for the provided information by giving the re-search keyword selected from each list box to the search engine. For example, when "テレビ" ("television set") is input in the input form as a keyword, requirements for a re-search keyword to be able to be selected include, for example, "maker", "model", "display type", "payment method", and "amount of money". Each requirement corresponds to an attribute's division.

CITATION LIST

Patent Literature

Patent Literature 1: WO 03/042869 A

SUMMARY OF INVENTION

Technical Problem

However, in the technique described in Patent Literature 1, the user has to do an operation to the list box in addition to an input operation to the input form. Further, there is a list box for each requirement. Therefore, it is required for the user to perform an operation to select a list box from which the user wants to select a re-search keyword and an operation to select the re-search keyword from the selected list box. Therefore, these operations are troublesome for the user. If an input area for inputting a word representing a content of an attribute as a search condition is provided for each attribute, an operation to select an input area is troublesome.

It can be considered that a word representing an attribute's division is input along with a word representing a content of an attribute, such as "価格 : 1000 ジャンル : ミネラルウォーター" ("price: 1000 category: mineral water"). Then, it can be considered that on the basis of the word representing an attribute's division, a search apparatus identifies the division corresponding to a content represented by the word representing the content of an attribute and performs a search by using the word representing the content of the attribute as a search condition of the attribute of the identified division. However, in this case, the user has to input a word representing an attribute's division in addition to a word representing a content of the attribute. Therefore, the input operation is troublesome.

The present invention is made in view of the above situation, and an object of the present invention is to provide a search apparatus, a search method, a search program, and a recording medium that enable a user to specify a search condition corresponding to an attribute of a division desired by the user even when the user does not perform an operation to specify the attribute's division.

Solution to Problem

In order to solve the above problem, the invention according to claim 1 is a search apparatus comprising: a first determination means that, for each of a plurality of input words input by a user in one input area in which at least keywords can be input, determines based on an input words whether or not the input word is a first attribute word representing a content of an attribute of a predetermined first division of a plurality of divisions of attributes had by a search object; and a search means that searches for a search object by using a content, as a search condition of attribute of the first division, represented by the input word which is determined to be the first attribute word by the first determination means.

According to this invention, whether or not an input word is a word that represents a content of the attribute of the first division is determined based on the input word itself. When there is an input word that represents a content of the attribute of the first division among a plurality of input words, the content represented by the input word is used as a search condition of the attribute of the first division and a search is performed. Therefore, the user can specify a search condition of the attribute of the first division by inputting a plurality of words including a word representing a content of the attribute of the first division without performing an operation to specify a division of attribute.

The invention according to claim 2 is the search apparatus according to claim 1, wherein at least one first division is a division of an attribute whose content is a value in a predetermined unit, and the first determination means determines that the input word meeting a minimum requirement that the input word includes a word representing the unit is the first attribute word.

According to this invention, the user can specify a search condition of the attribute of the first division by inputting a word including a word representing a unit.

The invention according to claim 3 is the search apparatus according to claim 2, wherein when the input word which is determined to be the first attribute word by the first determination means includes a representation specifying a range of values, the search means searches for a search object a value of the attribute of the first division of which is included in the range of values represented by the input word.

According to this invention, the user can specify a range of contents of an attribute as a search condition of the attribute of the first division by inputting a word representing a unit and a word including a representation specifying the range.

The invention according to claim 4 is the search apparatus according to any one of claims 1 to 3, wherein at least one of the divisions is a second division in which a content of an attribute is defined as a node in a tree structure and each content is hierarchically defined, the search apparatus further includes a second determination means that determines for each input word whether or not the input word is a second attribute word corresponding to at least one of a plurality of words stored in a word storage means storing a word representing a content of an attribute of the second division for each content in a tree structure, and a decision means that when there is a plurality of input words which are determined to be the second attribute words by the second determination means, decides a method of combining search conditions corresponding to the respective plurality of input words, which are determined to be the second attribute words, on the basis of a positional relationship between the input words in the tree structure, and the search means searches for a search object on the basis of a search condition obtained by combining search conditions corresponding to the respective plurality of input words, which are determined to be the second attribute words, by the method decided by the decision means.

According to this invention, when there is a plurality of input words that represent a content of the attribute of the second division among a plurality of input words, a method of combining search conditions corresponding to the respective input words is decided based on positional relationship between the input words which is determined according to positions of contents represented by the input words in the tree structure. Therefore, the user can specify a method of combining search conditions corresponding to respective words by inputting a plurality of words including a plurality of words, each of which represents a content of the attribute of the second division. In other words, the user can specify a method of combining search conditions even if the user does not perform an operation other than the input operation to the input area.

The invention according to claim 5 is the search apparatus according to claim 4, wherein when a certain plurality of the input words are siblings to each other, the decision means combines search conditions corresponding to the respective certain plurality of input words with each other with logical OR.

According to this invention, the user can specify to combine search conditions with logical OR by inputting a plurality of words that are in a sibling relationship to each other.

The invention according to claim 6 is the search apparatus according to claim 5, wherein the search means searches for a search object for each of the search conditions corresponding to the respective certain plurality of input words, and the search apparatus further includes a providing means that provides search object information indicating search objects found by the search means such that pieces of the search object information is displayed separately for the respective certain plurality of input words.

According to this invention, search results corresponding to a respective plurality of words that are in a sibling relationship to each other are separately displayed. Therefore, it is easy to compare search results between words that are in a sibling relationship.

The invention according to claim 7 is the search apparatus according to any one of claims 4 to 6, wherein when a certain input word is an ancestor of at least one other input words in the tree structure, the decision means decides to combine a search condition corresponding to the certain input word and a search condition corresponding to the at least the one other input word with logical AND.

According to this invention, the user can specify to combine search conditions with logical AND by inputting a plurality of words that are in an ancestor-descendant relationship to each other.

The invention according to claim 8 is the search apparatus according to any one of claims 4 to 7, wherein the search means decides that at least one of the input words which are determined to be the second attribute words by the second determination means is a keyword and decides a condition that character information stored in a character information storage means includes the keyword to be a search condition, the character information storage means storing character information related to a search object for each search object.

According to this invention, a search object is searched for whose character information includes an input word that represents a content of the attribute of the second division. Therefore, even when a content of an attribute that is actually had by a search object in the second division is not information, of the search object, which is associated with the search object in practice, it is possible to search for a search object having the attribute of a content represented by the input word.

The invention according to claim 9 is the search apparatus according to any one of claims 4 to 8, wherein the search means uses a content represented by at least one of a plurality of the input words which are determined to be the second attribute words by the second determination means as a search condition of attribute of the second division.

According to this invention, it is possible to search for a search object having an attribute of a content represented by an input word in the attribute of the second division.

The invention according to claim 10 is the search apparatus according to any one of claims 1 to 9, wherein by determining whether or not the input word is the first attribute word for each first division, the first determination means identifies an attribute of the first division whose content is represented by the input word, and the search means uses the input word for which the attribute of the first division is identified by the first determination means as a search condition of attribute of the first division identified.

According to this invention, the user can specify search conditions to attributes of a plurality of divisions.

The invention according to claim 11 is the search apparatus according to any one of claims 1 to 10, wherein when a certain input word includes a representation indicating exclusion, the search means uses negation of a condition corresponding to the certain input word as a search condition.

According to this invention, the user can specify a search condition of exclusion by inputting a word including a representation representing exclusion.

The invention according to claim 12 is the search apparatus according to any one of claims 1 to 11, wherein the search means decides that an input word which is not determined to be the first attribute word by the first determination means is a keyword and uses a condition that character information stored in a character information storage means includes the keyword as a search condition, the character information storage means storing character information related to a search object for each search object.

According to this invention, the user can specify a search condition of the attribute of the first division and a keyword by inputting a plurality of words including a word that represents a content of the attribute of the first division and a word that does not represent a content of the attribute of the first division.

According to another exemplary embodiment, a search method performed by a search apparatus includes: a first determination step of, for each of a plurality of input words input by a user in one input area in which at least keywords can be input, determining based on an input words whether or not the input word is a first attribute word representing a content of an attribute of a predetermined first division of a plurality of divisions of attributes had by a search object; and a search step of searching for a search object by using a content, as a search condition of attribute of the first division, represented by the input word which is determined to be the first attribute word in the first determination step.

According to another exemplary embodiment of this invention, a search program causes a computer included in a search apparatus to function as: a first determination means that, for each of a plurality of input words input by a user in one input area in which at least keywords can be input, determines based on an input words whether or not the input word is a first attribute word representing a content of an attribute of a predetermined first division of a plurality of divisions of attributes had by a search object; and a search means that searches for a search object by using a content, as a search condition of attribute of the first division, represented by the input word which is determined to be the first attribute word by the first determination means.

According to another exemplary embodiment of this invention, a recording medium includes a search program, the search program causing a computer included in a search apparatus to function as: a first determination means that, for each of a plurality of input words input by a user in one input area in which at least keywords can be input, determines based on an input words whether or not the input word is a first attribute word representing a content of an attribute of a predetermined first division of a plurality of divisions of attributes had by a search object; and a search means that searches for a search object by using a content, as a search condition of attribute of the first division, represented by the input word which is determined to be the first attribute word by the first determination means.

Advantageous Effects of Invention

According to the present invention, whether or not an input word is a word that represents a content of the attribute of the first division is determined based on the input word itself. When there is an input word that represents a content of the attribute of the first division among a plurality of input words, the content represented by the input word is used as a search condition of the attribute of the first division and a search is performed. Therefore, the user can specify a search condition of the attribute of the first division by inputting a plurality of words including a word representing a content of the attribute of the first division without performing an operation to specify a division of attribute.

BRIEF DESCRIPTION OF DRAWINGS

FIG. 3 is a diagram showing a generation example of a search expression when a plurality of keywords indicating categories are input.

FIG. 4 is a diagram showing a generation example of a search expression.

FIG. 5 is a diagram showing a screen display example of a search result page.

FIG. 7A is a diagram showing an example of contents registered in a member information DB 12a. FIG. 7B is a diagram showing an example of contents registered in a category information DB 12b. FIG. 7C is a diagram showing an example of contents registered in a sale item information DB 12c. FIG. 7D is a diagram showing an example of contents registered in an exclusion specification word DB 12d. FIG. 7E is a diagram showing an example of contents registered in a unit word DB 12e. FIG. 7F is a diagram showing an example of contents registered in a range specification word DB 12f.

DESCRIPTION OF EMBODIMENT

Hereinafter, an embodiment of the present invention will be described in detail with reference to the drawings. The embodiment described below is an embodiment in which the present invention is applied to a shopping system.

1. Schematic Configuration and Function of Shopping System

Figure 1:
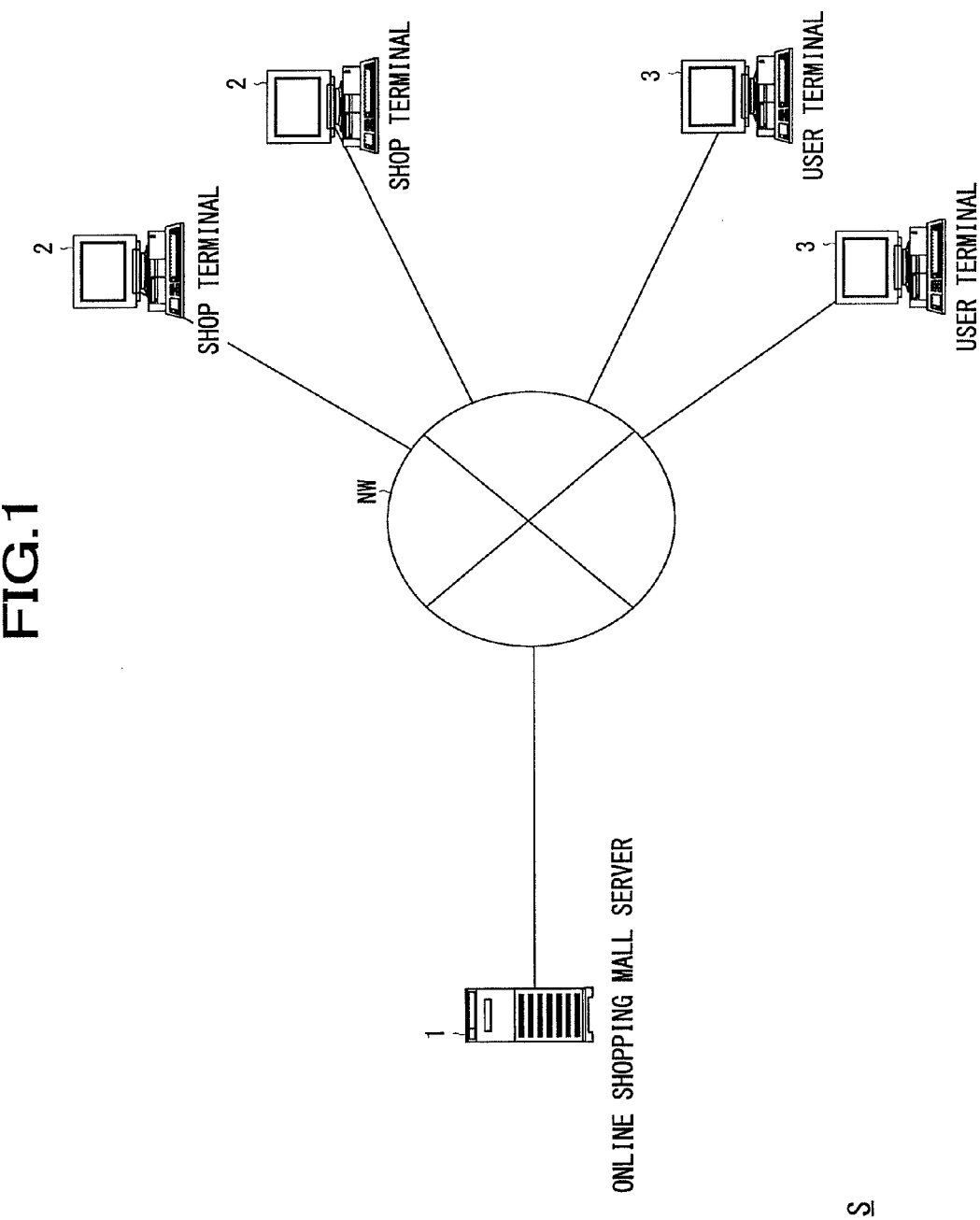
FIG. 1 is a diagram showing an example of a schematic configuration of a shopping system S according to an embodiment.

First, a configuration of a shopping system S according to the present embodiment will be described with reference to FIG. 1. FIG. 1 is a diagram showing an example of a schematic configuration of the shopping system S according to the present embodiment.

As shown in FIG. 1, the shopping system S includes an online shopping mall server 1, a plurality of shop terminals 2, and a plurality of user terminals 3. The online shopping mall server 1, each shop terminal 2, and each user terminal 3 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and a gateway.

The online shopping mall server 1 is a server device that performs various processes related to an online shopping mall from which items for sale can be purchased. The online shopping mall server 1 is an example of a search apparatus of the present invention. A user can purchase a desired item for sale from a desired shop by using the online shopping mall. For example, the online shopping mall server 1 transmits a web page of the online shopping mall and performs processes related to a search and a purchase of an item for sale according to a request from the user terminal 3. The item for sale is an example of a search object of the present invention.

The shop terminal 2 is a terminal device used by an employee or the like of a shop that is open in the online shopping mall. The shop terminal 2 accesses a server device such as the online shopping mall server 1 based on an operation from an employee or the like. Thereby, the shop terminal 2 receives a web page from the server device and displays the web page. In the shop terminal 2, software such as a browser and an email client is installed. For example, an employee registers information of an item for sale to be sold in the online shopping mall and checks a content of order of an item for sale by using the shop terminal 2.

The user terminal 3 is a terminal device of a user who uses the online shopping mall. The user terminal 3 receives a web page from the online shopping mall server 1 and displays the web page by accessing the online shopping mall server 1 based on an operation from a user. In the user terminal 3, software such as a browser and an email client is installed.

For example, a personal computer, a PDA (Personal Digital Assistant), a mobile information terminal such as a smartphone, and a mobile phone are used as the user terminal 3.

2. Specification of Search Condition

Figure 2:
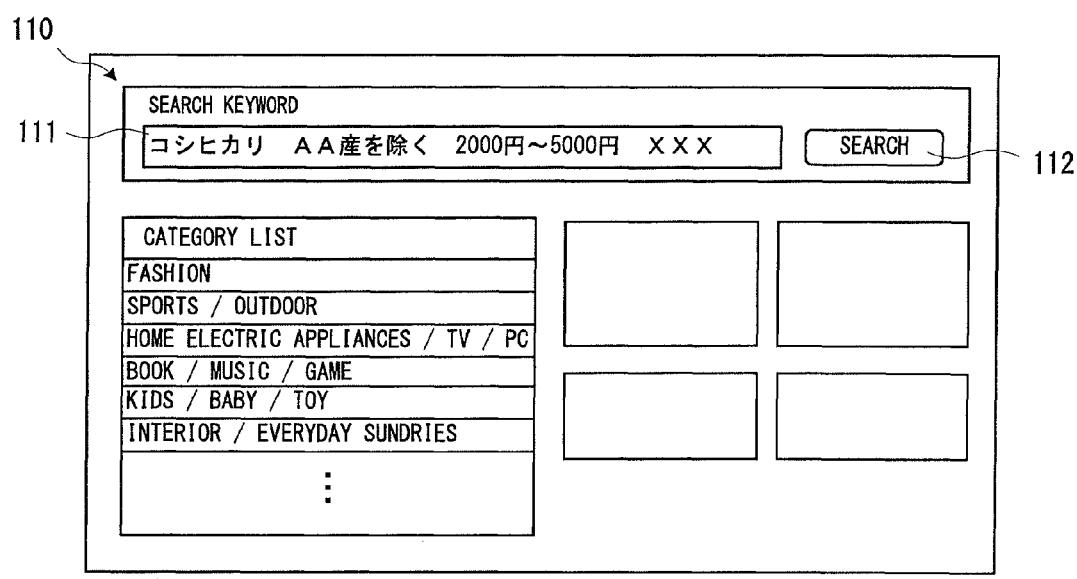
FIG. 2 is a diagram showing a display example of a top page of an online shopping mall.

Next, a method for a user to specify a search condition to be used to search for items for sale in the online shopping mall will be described with reference to FIGS. 2 to 5. FIG. 2 is a diagram showing a display example of a top page of the online shopping mall. The top page is a web page located at the highest level in the online shopping mall.

As shown in FIG. 2, the top page includes a search condition setting area 110. The search condition setting area 110 is an area in which widgets and the like to specify a search condition are displayed. The widget is an element or a component included in a web page. Specifically, in the search condition setting area 110, one search word input field 111 and a search button 112 are displayed.

The search word input field 111 is an area for inputting search words. The search word input field 111 is an example of an input area of the present invention. The search word is a word representing a search condition of items for sale, etc. The search word input in the search word input field 111 is an example of an input word of the present invention. FIG. 2 shows a state in which search words have been input in the search word input field 111 by a user.

The search button 112 is a button to transmit the search words input in the search word input field 111 to the online shopping mall server 1. The search button 112 is also a button to cause the online shopping mall server 1 to search for items for sale. After the user inputs search words in the search word input field 111, the user can transmit the input search words to the online shopping mall server 1 by, for example, pressing an enter key, an execution key, or the like. Then, the online shopping mall server 1 searches for items for sale based on the search words.

A user can input a plurality of search keywords in the search word input field 111 by inputting a space between the search keywords. The user can specify a detailed search condition by inputting a plurality of search words. A method of specifying a search condition will be described below. The user can cause the online shopping mall server 1 to search for items for sale by inputting only one search word in the search word input field 111.

2-1. Keyword

A user can input a keyword used in a keyword search as a search word. In the keyword search, items for sale are searched for whose character information registered in the online shopping mall as information of the item for sale includes the input keyword. Examples of the character information include a sale item name and a sale item description. In this case, a search condition is that at least one of the sale item name and the sale item description includes the input keyword.

The user can include characters such as "除く" ("exclude"), "以外" ("except for"), "含まない" ("not include"), "除外" ("exclusion"), and "ではない" ("is not"), which represent exclusion, in a search word. Such characters are referred to as an "exclusion specification word". When an exclusion specification word is included in a search word, a keyword is the remaining part of the search word after the exclusion specification word is removed from the search word. In this case, a search condition is that neither the sale item name nor the sale item description includes the keyword from which the exclusion specification word is removed. In other words, a logical operation of negation is performed on the search condition. For example, when the search word is "XXX を除く" ("exclude XXX"), items for sale are searched for which meet a condition that neither the sale item name nor the sale item description includes "XXX". Here, "を" located before "除く" is a postposition that connects the keyword with the exclusion specification word, so that the particle is also removed. The exclusion specification word is an example of a representation indicating exclusion of the present invention.

2-2. Sale Item Price

The user can input, as search words, words which represent an attribute that should be held by items for sale which the user wants to search for. Each item for sale has a plurality of attributes. The attributes of item for sale are classified into a plurality of divisions. Examples of the division of attributes include a sale item name, a distributor shop, a sale item price, and a category. The division of attributes is also referred to as an item of attributes.

When the user inputs a number including "円" ("yen"), which is a character representing a Japanese currency unit, as a search word, the amount of money represented by the search word is specified as a search condition for the sale item price. For example, when the search word is "1000 円" ("1000 yen"), the search condition is that the sale item price is 1000 yen. At this time, the user need not input a word that represents a division of attribute, such as, for example, "価格 1000 円" ("price 1000 yen"). The amount of money and the sale item price are associated with each other in advance, so that even if the item for sale has an attribute represented by the amount of money besides the sale item price, it is automatically determined that a search word of the amount of money which includes "円" represents the sale item price. The sale item price is an example of a first division of the present invention. The "1000 円" is an example of a first attribute word of the present invention.

When the user inputs words that represent the amount of money as a search word, the user can include words such as "以上" ("higher than or equal to"), "以下" ("lower than or equal to"), and "未満" ("lower than"), which specify a range or represent a high-low relation, in the search word. Such words are referred to as a "range specification word". When the search word includes a word that represents the amount of money and the range specification word, the search condition is that the sale item price is included in a range of the amount of money represented by the search word. The range specification word is an example of an expression specifying a range of values of the present invention.

Although in the present embodiment, the division of attribute that can specify a search condition is the sale item price, attributes of other divisions may be able to specify a search condition.

2-3. Category

An item for sale has a category of the item for sale as an attribute. Each item for sale is classified into any categories. The user can input a name of the category of an item for sale as a search word. The name of the category is referred to as a "category name". However, even when a category name is input as a search word, the category represented by the category name is not used as a search condition for the category of the item for sale. In this case, the search word is used as a keyword in a keyword search. The reason of this is as follows.

When a shop registers information of an item for sale in the online shopping mall, the shop also registers information of a category. At this time, the shop can specify any category. Therefore, an item for sale that actually belongs to a certain category is not necessarily registered along with the category. In other words, even if a category is specified as a search condition, all items for sale that belong to the category desired by the user are not necessarily searched for. On the other hand, a sale item name and a sale item description often include an actual name of the category. Therefore, a search word that represents the category name is used as a keyword. Further, it is possible to search for items for sale related to a category represented by a search word. A category represented by a search word may be used as a search condition for a category of item for sale. The details of this case will be described later. The category is an example of an attribute of a second division of the present invention. The category name is an example of a second attribute word of the present invention.

However, a search word representing a category and a search word used as a mere keyword that does not represent a category are partially separately processed. That is a logical operation method used when combining search conditions corresponding to respective search words.

Here, the details of categories of item for sale will be described. For example, a category of item for sale is a range, a division, or a category to which items for sale of similar type, characteristics, usage, or the like belong when items for sale are divided by type, characteristics, usage, or the like. The categories of item for sale are hierarchically defined by a tree structure. This tree structure is referred to as a "category tree". Specifically, each node in the category tree corresponds to a category. The depth of the node corresponds to a level (a layer) of the category corresponding to the node. The depth of the node is a distance from a node located at the root.

The node located at the root is referred to as a "root node". In the category tree, a category called a category top is defined for the root node for convenience. The greater the value of the level, the deeper the depth of the level is. The smaller the value of the level, the shallower the depth of the level is. The category top is the category of level 0. Categories corresponding to child nodes of the category top are categories of level 1. The categories of level 1 are substantially the highest categories. As the categories of level 1, for example, there are "water/soft drink", "beauty/cosmetic/perfume water", "pet/pet goods", "lady's fashion", and "men's fashion". For each category of level 1, categories corresponding to child nodes are defined as categories of level 2. Here, a category G11 corresponding to a child node of a certain category G1 is referred to as a "child category" of the category G1. The child category is also referred to as a sub-category. At this time, the category G1 is referred to as a "parent category" of the category G11. The child category is a range to which similar items for sale belong when the parent category is further divided into a plurality of categories. Therefore, the child category belongs to the parent category.

A category corresponding to a descendant node of a certain category is referred to as a "descendant category". For example, a category G111 is assumed to be a child category of the category G11. In this case, the categories G11 and G111 are descendant categories of the category G1. It is assumed that the category G1 itself is not a descendant category of the category G1. A category corresponding to an ancestor node of a certain category is referred to as an "ancestor category". The categories G1 and G11 are ancestor categories of the category G111. It is assumed that the category G111 itself is not an ancestor category of the category G111.

When a certain category includes child categories, a plurality of child categories are normally defined. For example, as the child categories of "water/mineral water", for example, "water/mineral water", "soft drink", and "coffee/cocoa" are defined. Categories that belong to the same parent category are referred to as sibling categories. For example, the "water/mineral water", the "soft drink", and the "coffee/cocoa" are sibling categories to each other. For categories at level 2 or lower, child categories are defined as needed.

It can be said that a category at each level represents a content of an attribute of items for sale. It can be said that a plurality of categories that are siblings to each other represent a content different from each other in an attribute of the same division. For example, it can be considered that a category of level 1 represents a division of attribute which is a large category of item for sale. On the other hand, the "water/mineral water", the "soft drink", and the "coffee/cocoa" represent content of an attribute of a division which is a type of beverage. As child categories of the "water/mineral water", for example, brands such as "AAAAA", "BBBBB", and "CCCCC" are defined. These are contents of an attribute of a division which is a brand of water or mineral water. For example, it can be considered that for an item for sale belonging to the category of "AAAAA" has an attribute that the item for sale is a soft drink, an attribute that the item for sale is water or mineral water, and an attribute that the brand is AAAAA. For example, an attribute of a division to which a category of each level corresponds is defined for each category.

2-4. Combination of a Plurality of Search Conditions

The online shopping mall server 1 generates a search expression representing a final search condition by combining search conditions corresponding to respective input search words. In the search expression, the search conditions corresponding to the search words are combined with logical operators. When the search conditions corresponding to the search words are combined, normally, the search conditions are combined with logical AND. For example, when there are a search condition C1 and a search condition C2, the search condition is to satisfy both search conditions C1 and C2. However, when there are a plurality of search words representing category names, a method of logical operation is determined based on a positional relationship among the categories represented by the search words in the category tree, with respect to the plurality of search words.

A category represented by a certain search word is an ancestor of categories represented by at least another search word, search conditions are combined with logical AND. This is because when a user specifies a plurality of search words in such a relationship, there is a probability that the user wants to search for items for sale belonging to a descendant category from among items for sale belonging to an ancestor category. In other words, there is a probability that the user wants to narrow down items for sale by using a plurality of categories. Search words in a parent-child relationship are also in a relationship between an ancestor and the descendant.

When categories represented respectively by a plurality of search words are in a sibling relationship, search conditions are combined with logical OR. In other words, when there are a search condition C3 and a search condition C4, the search condition is to satisfy at least one of the search conditions C3 and C4. A plurality of categories in a sibling relationship represent contents of an attribute different from each other in an attribute of the same division. Therefore, it is indicated that categories in a sibling relationship are in a parallel or equal relationship as a search condition. Therefore, it is considered that items for sale belonging to each of the categories in a sibling relationship need to be searched for. This is because when a user specifies a plurality of search words in such a relationship, there is a probability that the user wants to search for items for sale belonging to at least any one of categories represented by the search words.

When categories represented respectively by two search words are neither in an ancestor-descendant relationship nor in a sibling relationship, search conditions are combined with logical OR. This is because the categories are not related to each other, so that it is considered that items for sale belonging to each category need to be searched for separately. In this case, search conditions may be combined with logical AND.

A specific example of a search expression generated when a plurality of search words representing categories are input will be described below. Here, an operator of logical AND is defined as "*", an operator of logical OR is defined as "-", and an operator of negation is defined as "-". The search expression described here is a search expression obtained by simplifying an actually used search expression.

FIG. 3A is a diagram showing an example of a category tree. As shown in FIG. 3A, there is a plurality of Gi (i=1, 2, 3, and so on) as categories of level 1. For example, G1 and G2 are categories of level 1. Further, G1 and G2 are siblings to each other. There is a plurality of Gij (j=1, 2, 3, and so on) as categories of level 2. Gij is a child category of a category i. For example, G11 is a child category of G1. Further, for example, G23 is a child category of G2. There is a plurality of Gijk (k=1, 2, 3, and so on) as categories of level 3. Gijk is a child category of Gik. There may be categories of level 4 or lower.

Here, it is assumed that search words input by a user are "G1 G13 G113 を除く G211 G212 G222" ("G1 G13 exclude G113 G211 G212 G222") as shown in FIG. 3B. In this case, categories of level 3 which is the lowest level of the categories represented by the search words are identified and a monomial is generated as a search expression corresponding to each category. G113, G211, G212, and G222 are categories of level 3. Here, a search expression "-G113" is generated from "G113 を除く" ("exclude G113"). Regarding the other categories, the category itself becomes the search expression. For example, the search expression of G113 is "G113". Next, a sibling relationship is checked. G211 and G212 are in a sibling relationship. Therefore, "G211" and "G212" are combined with logical OR and a search expression "G211+G212" is generated.

Next, a category of level 2 is identified. G13 is the category of level 2. Further, a parent category of each of G113, G211, G212, and G222 is identified. The parent category of G113 is G11. The parent category of G211 and G212 is G21. The parent category of G222 is G22. Here, a parent-child relationship is checked between the category of level 2 and the categories of level 3. Here, there are no categories in a parent-child relationship. Next, a sibling relationship is checked between the categories of level 2. G11 and G13 are in a sibling relationship. Therefore, "-G113" and "G13" corresponding to G11 are combined with logical OR and a search expression "-G113+G13" is generated. Thereby G113 and G13, which are neither in an ancestor-descendant relationship nor in a sibling relationship, are combined with logical OR. Further, G21 and G22 are in a sibling relationship. Therefore, "G211+G212" corresponding to G21 and "G222" corresponding to G22 are combined with logical OR and a search expression "(G211+ G212)+G222" is generated. Also in this case, G211 and G212, and G222, which are neither in an ancestor-descendant relationship nor in a sibling relationship, are combined with logical OR. When a polynomial and a monomial are combined or a polynomial and a polynomial are combined, a delimiter "(",")" is added to the polynomial.

Next, a category of level 1 is identified. G1 is the category of level 1. Further, G1 is identified as the parent category of G11 and G13, and G2 is identified as the parent category of G21 and G22. Here, a parent-child relationship is checked between the categories of level 1 and the categories of level 2. G1 is the parent category of G11 and G13. Therefore, "G1" and "−G113+G13" corresponding to G11 and G13 are combined with logical AND and a search expression "(−G113+G13)*G1" is generated. "(−G113+G13)*G1" is equivalent to "−G113*G1+G13*G1". Therefore, G1 and G13 which are in a parent-child relationship are combined with logical AND and G1 and G113 which are in an ancestor-descendant relationship are combined with logical AND. Next, a sibling relationship is checked between the categories of level 1. G1 and G2 are in a sibling relationship. Therefore, "(−G113+G13)*G1" corresponding to G1 and "(G211+G212)+G222" corresponding to G2 are combined with logical OR and a search expression "((−G113+G13)*G1)+((G211+G212)+G222)" is generated as shown in FIG. 3C. This is the final search expression related to the categories.

2-5. Generation of Search Expression

Next, a generation method of a search expression used for an actual search will be described along with an input example of search words. The online shopping mall server 1 converts each of a plurality of input search words into a search word with a label attached. Then, the online shopping mall server 1 combines the search words with a label attached with logical operators and generates a search expression.

As the label, there is an attribute label that represents an attribute of the search word. As the attribute label, there are "kw:" that represents a keyword and "pr:" that represents a sale item price. Further, as the label, there is an additional condition label that represents a condition added to the search word. As the additional condition label, there is "nt:" that represents negation. In other words, the negation is represented by a label instead of a logical operator. Further, as the additional condition label, there is a label that represents a range specification. As the label that represents a range specification, there are "mn:" that represents "～以上" ("higher than or equal to"), "mx:" that represents "～以下" ("lower than or equal to"), ":gt" that represents "～より大きい" ("higher than"), and "lt:" that represents "～小さい" ("lower than").

EXAMPLE 1

FIG. 4A is an input example of search words. FIG. 4B is an example of a generated search expression. It is assumed that a user wants to search for rice whose variety is Koshihikari and whose production area is other than AA. Further, in addition to the above conditions, it is assumed that the user wants to search for rice whose sale item price is higher than or equal to 2000 yen and lower than or equal to 5000 yen. Further, in addition to the above conditions, it is assumed that the user wants to search for items for sale whose sale item description includes "XXX". Therefore, as shown in FIG. 4A, the user inputs "コシヒカリ AA産を除く XXX 2000 円-5000 円" ("koshihikari exclude AA growth XXX 2000 yen-5000 yen") in the search word input field 111.

Here, as categories of item for sale, there are "rice", "Koshihikari", and "AA growth". "Koshihikari" is a child category of "rice". "AA growth" is a child category of "Koshihikari". Specifically, there are a category of rice, a category of rice whose variety is Koshihikari, and a category of rice whose production area is AA and whose variety is Koshihikari. Further, as child categories of "Koshihikari", there are "BB growth" and "CC growth". On the other hand, "XXX" is not a category name.

First, the search word "コシヒカリ" ("koshihikari") is a category name, so that "kw:コシヒカリ" ("kw:koshihikari") is generated. The search word "AA産を除く" ("exclude AA growth") includes an exclusion specification word "除く" ("exclude"). Therefore, "除く" is removed from "AA産を除く". "AA産" ("AA growth") is a category name. Therefore, the "kw:nt:AA産" ("kw:nt:AA growth") is generated. Further, "kw:XXX" is generated from "XXX".

The search word "2000 円-5000 円" ("2000 yen-5000 yen") includes "円" ("yen") which is a unit word of Japanese currency and "−". When a search word including a unit word includes "−", the search word is divided into a part before "−" and a part after "−". Then, "円" is removed from each divided search word. Further, a label corresponding to a unit word and an additional condition label corresponding to the position of the search word with respect to "−" are added to each search word. Here, "pr:mn:2000" and "pr:mx:5000" are generated.

Next, a logical operator for combining search words of category name is determined. "コシヒカリ" ("koshihikari") and "AA産" ("AA growth") are in a parent-child relationship, so that the logical operator is "*". Therefore, "kw:コシヒカリ*kw:nt:AA産" ("kw:koshihikari*kw:nt:AA growth") is generated. Next, a search word of category name and a search word that is not a category name are combined with "*". This is because there is a probability that when the user does not specify a category as a search word, the user wants to narrow down items for sale by the keyword. Therefore, "(kw:コシヒカリ*kw:nt:AA産)*kw:XXX" ("(kw:koshihikari*kw:nt:AA growth)*kw:XXX") is generated. A search word of category name and a search word that is not a category name may be combined with "+".

Then, a set of search words of category names and a search word that is not a category name and another search word are combined with "*". Thereby, as shown in FIG. 4B, "((kw:コシヒカリ*kw:nt:AA産)*kw:XXX)*pr:mn: 2000*pr:mx:5000" ("((kw:koshihikari*kw:nt:AA growth) *kw:XXX)*pr:mn:2000*pr:mx:5000") is generated. This is a search expression used for the search. This search expression means to search for items for sale which meet a condition that at least one of the sale item name and the sale item description includes "コシヒカリ" and "AA産", neither the sale item name nor the sale item description includes "XXX", and the sale item price is higher than or equal to 2000 yen and lower than or equal to 5000 yen.

EXAMPLE 2

FIG. 4C is an input example of search words. FIGS. 4D to 4F are an example of a generated search expression. It is assumed that a user wants to search for both of digital cameras manufactured by an A company and digital cameras manufactured by a B company. Further, in addition to the above conditions, it is assumed that the user wants to search for digital cameras whose sale item price is lower than 10000 yen. Therefore, as shown in FIG. 4C, the user inputs "デジタルカメラ A社 B社 1万円未満" ("digital camera A company B company lower than 10 thousand yen") in the search word input field 111.

Here, as categories of item for sale, there are "digital camera", "A company", and "B company". "A company" and B company" are child categories of "digital Camera". Specifically, there are a category of digital camera, a category of digital camera manufactured by the A company among digital cameras, and a category of digital camera manufactured by the B company among digital cameras.

First, "kw:デジタルカメラ" ("kw:digital camera"), "kw:A社" ("kw:A company"), "kw:B社" ("kw:B company"), and "pr:lt:1万" ("pr:lt:10 thousand") are generated. Next, "kw:A社 +kw:B社" ("kw:A company+kw:B company") is generated because "A company" and "B company" are in a sibling relationship. Next, "kw:デジタルカメラ*(kw:A社 +kw: B社" ("kw:digital camera*(kw:A company+kw:B company)") is generated because "digital camera" is in a parent-child relationship with "A company" and "B company". Then, as shown in FIG. 4D, "kw:デジタルカメラ*(kw:A社 +kw:B社)*pr:lt:1　万" ("kw:digital camera*(kw:A company+kw:B company)*pr:lt:10 thousand") is generated.

Normally, this search expression is used for the search. However, when there is a plurality of categories that are in a sibling relationship among categories represented by a plurality of search words, the search expression is divided based on a distributive law. Then, a search expression used for the search is generated for each of the plurality of categories that are in a sibling relationship. Then, a search is performed for each generated search expression and a search result is displayed for each search expression.

The search expression shown in FIG. 4D is divided into a search expression including "kw:A社" ("kw:A company") and a search expression including "kw:B社 t" ("kw:B company"). Therefore, as shown in FIG. 4E, "kw:デジタルカメラ *kw:A社 *pr:lt:1万" ("kw:digital camera*kw:A company*pr:lt:10 thousand") is generated, and as shown in FIG. 4F, "kw:デジタルカメラ *kw:B社 *pr:lt:1 万" ("kw:digital camera*kw:B company*pr:lt: 10 thousand") is generated.

The search expression shown in FIG. 4E means to search for items for sale which meet a condition that at least one of the sale item name and the sale item description includes "デジタルカメラ" and "A社" and the sale item price is lower than 10000 yen. The search expression shown in FIG. 4F means to search for items for sale which meet a condition that at least one of the sale item name and the sale item description includes "デジタルカメラ" and "B社" and the sale item price is lower than 10000 yen. A search result obtained by the search expression shown in FIG. 4D and a search result obtained by the search expressions shown in FIGS. 4E and 4F are basically the same. However, items for sale which meet a condition that at least one of the sale item name and the sale item description includes "A社" and "B社" appear in both of a search result obtained by the search expression shown in FIG. 4E and a search result obtained by the search expression shown in FIG. 4F.

FIG. 5 is a diagram showing a screen display example of a search result page. The search result page is a web page showing a search result of items for sale. As shown in FIG. 5, the search result page includes a search condition setting area 110, a search result display area 120a, and a search result display area 120b.

In a search word input field 111 in the search condition setting area 110, the search words input in the top page is displayed in a state in which the search words is input in the search word input field 111. A user can re-specify a search condition and search for items for sale by editing the search words in the search word input field 111.

In each of the search result display areas 120a and 120b, a list of information of found items for sale is displayed as a search result. Specifically, in the search result display areas 120a and 120b, an image of a found item for sale, a sale item name, a price, and a shop name is displayed for each item for sale. Normally, only one search result display area is displayed. However, when a search is performed using a plurality of search expressions, a plurality of search result display areas are displayed. Specifically, in the search result display area 120a, a search result obtained by the search expression shown in FIG. 4E is displayed. On the other hand, in the search result display area 120b, a search result obtained by the search expression shown in FIG. 4F is displayed. In this way, the search result is displayed for each manufacturer of digital camera. In other words, in an attribute of a division of a manufacturer of digital camera, the search results are displayed separately for respective manufacturers at the same time. Therefore, the user can compare the search results between the manufacturers.

However, there is a condition to display the search result display area for each content of attribute. For example, as shown in FIG. 3A, G211 and G212 are in a sibling relationship. However, by the search expression shown in FIG. 3C, items for sale whose sale item name and sale item description include neither G211 nor G212 are also searched for. This is because there is a category which is neither an ancestor nor a descendant of G211 and G212. Therefore, when a category name of a category which is neither an ancestor nor a descendant of categories that are in a sibling relationship is not input as a search word, a plurality of search result display areas are displayed. In other words, only when a logical operator "+" does not appear anywhere in the search expression other than a part that combines search words of category names of categories that are in a sibling relationship, a plurality of search result display areas are displayed.

In these ways, the user can specify a detailed search condition by only inputting search words representing a content of attribute of items for sale in the search word input field 111. At this time, the user need not input each search word by adding a word representing a division of attribute to the search word.

In the category tree, the same category name may be given to a plurality of categories different from each other. For example, it is assumed that "A company" is a child category of "digital camera" and also a child category of "printer". In this case, regarding categories, a category of a digital camera manufactured by the A company and a category of a printer manufactured by the A company are clearly distinguished from each other. However, when the user inputs "A社" ("A company") as a search word, it is not possible to determine one category corresponding to "A社" by only "A社".

Therefore, for example, a category may be assigned to each search word according to a positional relationship between categories represented by respective search words. For example, a category that forms a sibling relationship among categories represented by respective search words is preferentially assigned. Next, a category that forms a parent-child relationship among categories represented by respective search words is preferentially assigned. Next, a category that forms an ancestor-descendant relationship among categories represented by respective search words is preferentially assigned.

For example, "A社 B社" ("A company B company") is input as a search word. "B company" is not a child category of "printer". "A company" and "B company" are in a sibling relationship as child categories of "digital camera". Therefore, a category of digital camera manufactured by the A company is assigned to "A社". For example, "プリンター A社" ("printer A company") is input as a search word. "printer" and "A company" are in a parent-child relationship. Therefore, a category of printer manufactured by the A company is assigned to "A社".

For example "A社 ミネラルウォーター" ("A company mineral water") is input. Although "ミネラルウォーター" ("mineral water") represents a category, "A company" and "mineral water" are neither in a sibling relationship nor in an ancestor-descendant relationship. In this case, for example, either one or both of the category of digital camera manufactured by the A company and the category of printer manufactured by the A company may be assigned to "A社". When both of the categories are assigned, the online shopping mall server 1 may perform processes by assuming that two "A社"s which represent categories different from each other are input.

3. Configuration of Online Shopping Mall Server

Next, a configuration of the online shopping mall server 1 will be described with reference to FIGS. 6 and 7.

Figure 6:
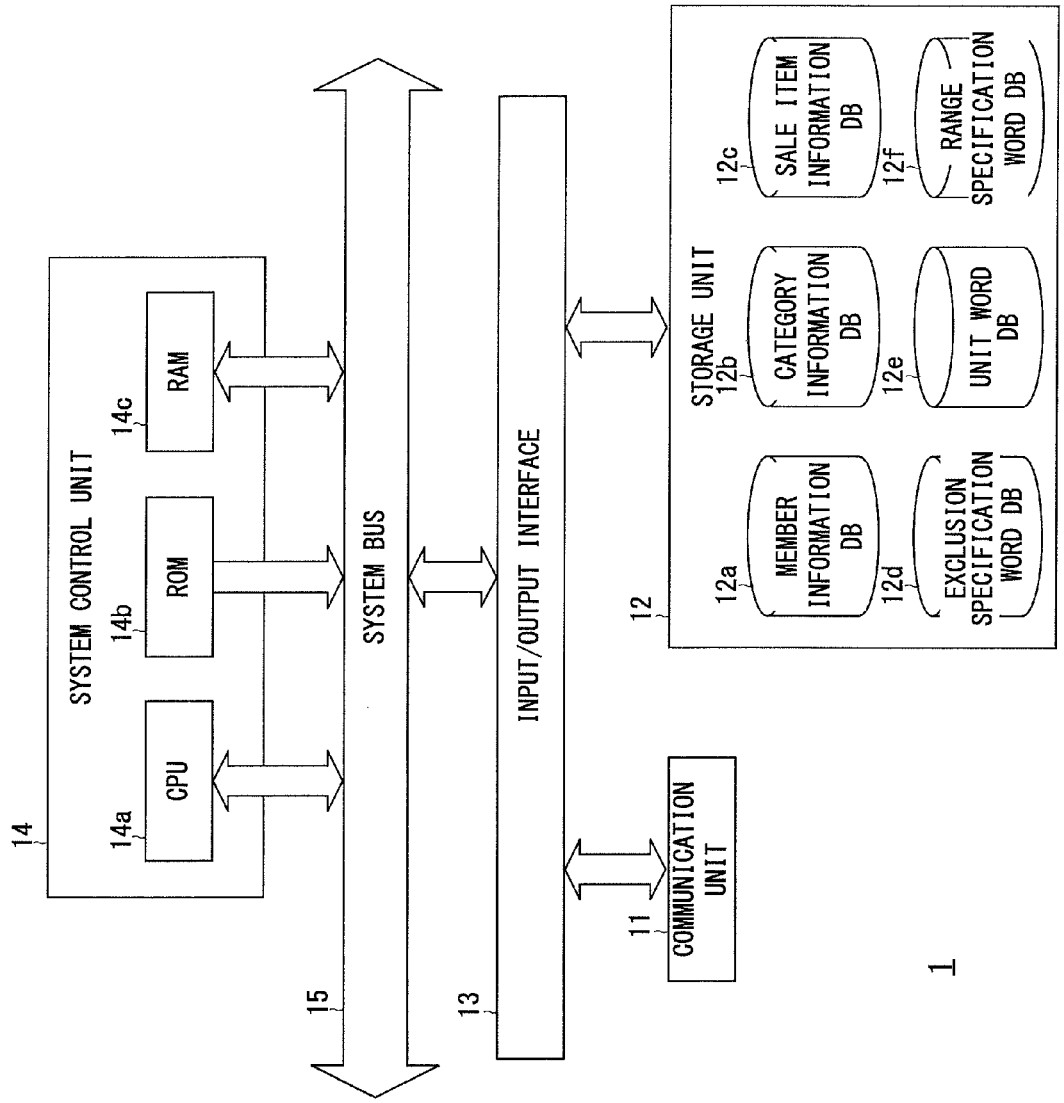
FIG. 6 is a block diagram showing an example of a schematic configuration of an online shopping mall server 1 according to an embodiment.

FIG. 6 is a block diagram showing an example of a schematic configuration of the online shopping mall server 1 according to the present embodiment. As shown in FIG. 6, the online shopping mall server 1 includes a communication unit 11, a storage unit 12, an input/output interface 13, and a system control unit 14. The system control unit 14 and the input/output interface 13 are connected through a system bus 15.

The communication unit 11 connects to the network NW and controls communication state with the user terminals 3 and the like.

The storage unit 12 includes, for example, a hard disk drive and the like. The storage unit 12 is an example of a word storage means and a character information storage means of the present invention. In the storage unit 12, databases such as a member information DB 12a, a category information DB 12b, a sale item information DB 12c, an exclusion specification word DB 12d, a unit word DB 12e, and a range specification word DB 12f are constructed.

FIG. 7A is a diagram showing an example of contents registered in the member information DB 12a. In the member information DB 12a, member information related to users registered in the shopping system S as a member is registered. Specifically, in the member information DB 12a, pieces of information of user attributes such as a user ID, a password, a nickname, a name, a date of birth, a gender, a postal code, an address, a phone number, and an email address are registered in association with each other for each user. The user ID is identification information of the user.

FIG. 7B is a diagram showing an example of contents registered in the category information DB 12b. In the category information DB 12b, category information related to categories of items for sale is registered. Specifically, in the category information DB 12b, pieces of information of attributes of a category such as a category ID, a category name, a level of the category, a parent category ID, and a child category ID list are registered in association with each other for each category. The category ID is identification information of the category. The parent category ID is a category ID of the parent category of the category defined by the category information. The child category ID list is a list of category IDs of child categories of the category defined by the category information. The child category ID list is set when the category defined by the category information has one or more child categories. In this way, a plurality of pieces of category information are stored in a tree structure. This is because categories are associated with each other as a parent category and a child category by the category information. For example, the category information is set by an administrator or the like of the online shopping mall. Specifically, the administrator or the like determines what categories are provided, a structure of the categories, and the like, and sets the category information according to the determination.

FIG. 7C is a diagram showing an example of contents registered in the sale item information DB 12c. In the sale item information DB 12c, sale item information related to the items for sale sold in the online shopping mall is registered. Specifically, in the sale item information DB 12c, attribute values of an item for sale such as a sale item ID, a shop ID, a sale item code, a category ID, a sale item name, a URL (Uniform Resource Locator) of a sale item image, a sale item description, and a sale item price are registered in association with each other for each item for sale sold by shops. The attribute value is information indicating a content of an attribute of an item for sale. The attribute value is information represented by, for example, characters and/or numerical values. The attribute value is registered for each division of attribute. The sale item ID is identification information of item for sale for a shop or the like to manage the item for sale sold by the shop. The shop ID indicates a shop which sells the item for sale. The product code is a code number to identify the item for sale. Examples of the item for sale code include, for example, JAN (Japanese Article Number Code) and the like. The category ID is a category ID of a category to which the item for sale belongs. In the sale item information, a category ID of a category of the lowest level is set. In other words, a category ID of the most subdivided category is set. In the present embodiment, a search word input as a category name is used in a keyword search. Therefore, the category ID is not used to search for items for sale, so that the category ID need not be included in the sale item information. Each of the sale item name and the sale item description is information represented by one or more characters. The sale item name and the sale item description are an example of character information of the present invention.

FIG. 7D is a diagram showing an example of contents registered in the exclusion specification word DB 12d. In the exclusion specification word DB 12d, a plurality of exclusion specification words are registered. For example, in the exclusion specification word DB 12d, "除く" ("exclude"), "以外" ("except for"), "含まない" ("not include"), "除外" ("exclusion"), and the like are registered.

FIG. 7E is a diagram showing an example of contents registered in the unit word DB 12e. In the unit word DB 12e, unit words are registered. Specifically, in the unit word DB 12e, a unit word and an attribute label corresponding to the unit word are registered in association with each other for each unit word. For example, "円" ("yen") and "pr" are registered in association with each other. In this way, the unit word is associated with a division of attribute.

FIG. 7F is a diagram showing an example of contents registered in the range specification word DB 12f. In the range specification word DB 12f, a plurality of range specification words are registered. Specifically, in the range specification word DB 12f, a range specification word and an additional condition label corresponding to the range specification word are registered in association with each other for each range specification word. For example, a pair of "以上" ("higher than or equal to") and "mn", a pair of "以下" ("lower than or equal to") and "mx", a pair of "より高い" ("higher than") and "gt", a pair of "より安い" ("lower than") and "lt", a pair of "未満" ("lower than") and "lt", and a pair of "–" and "mn:mx" are registered in association with each other for each pair. Here, "mn:mx" indicates that a search word is divided into two search words, "mn" is added to a search word before "–", and "mx" is added to a search word after "–".

Next, other information stored in the storage unit 12 will be described. The storage unit 12 stores various data such as HTML (HyperText Markup Language) documents, XML (Extensible Markup Language) documents, image data, text data, and electronic documents, which are for displaying web pages. Further, the storage unit 12 stores various setting values set by an administrator or the like.

Further, the storage unit 12 stores various programs such as an operating system, a WWW (World Wide Web) server program, a DBMS (Database Management System), an electronic commerce management program, and a search control program. The electronic commerce management program is a program for performing processes related to the online shopping mall, such as processes related to generating a web page of the online shopping mall and ordering an item for sale. The search control program is an example of a search program of the present invention. The search control program is a program to generate a search expression based on search words input by a user and search for items for sale based on the search expression. For example, the various programs may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

The system control unit 14 includes a CPU 14a, a ROM (Read Only Memory) 14b, a RAM (Random Access Memory) 14c, and the like. In the system control unit 14, the CPU 14a reads and executes various programs, so that the system control unit 14 functions as a first determination means, a search means, a second determination means, a decision means, and a providing means of the present invention.

The online shopping mall server 1 may include a plurality of server devices. For example, a server device that searches for items for sale, a server device that performs processes related to ordering an item for sale, a server device that transmits a web page according to a request from the user terminal 3, a server device that manages databases, and the like may be connected to each other by a LAN or the like.

4. Operation of Shopping System

Next, an operation of the shopping system S will be described with reference to FIGS. 8 to 14.

Figure 8:
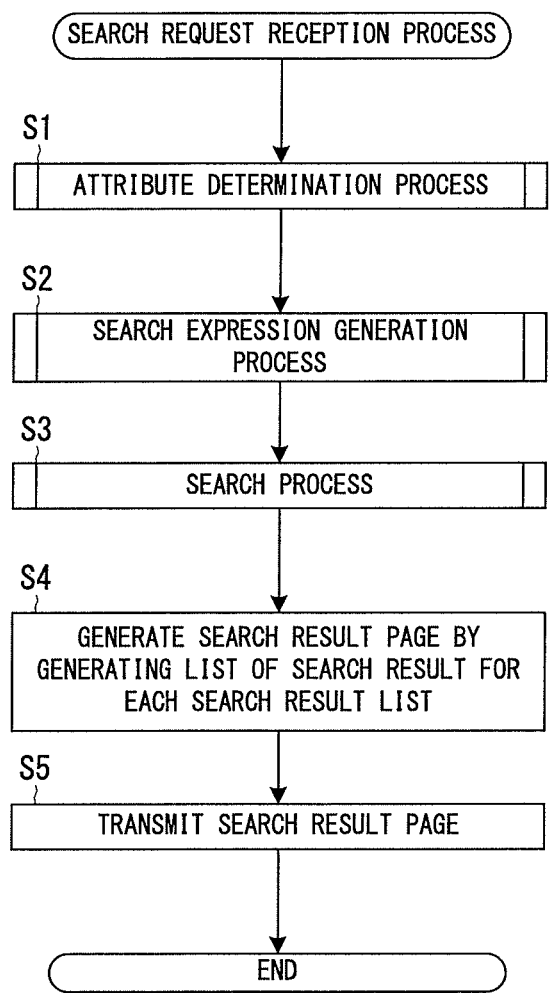
FIG. 8 is a flowchart showing a process example of a search request reception process of a system control unit 14 of the online shopping mall server 1 according to the embodiment.

FIG. 8 is a flowchart showing a process example of a search request reception process of the system control unit 14 of the online shopping mall server 1 according to the present embodiment.

When the top page or the search result page is displayed on a screen of the user terminal 3, a user inputs one or more search words in the search word input field 111. Then, the user inputs an Enter key or the like or selects the search button 112. Then, the user terminal 3 transmits a search request including the input search words to the online shopping mall server 1. The search request is a message indicating a request of search. The search request reception process is started when the online shopping mall server 1 receives the search request.

As shown in FIG. 8, the system control unit 14 performs an attribute determination process (step S1). In the attribute determination process, a division of attribute corresponding to a content of each search word included in the search request is determined. The details of the attribute determination process will be described later.

Next, the system control unit 14 performs a search expression generation process (step S2). In the search expression generation process, a search expression is generated based on search words included in the search request and determination results of the divisions of attributes in the attribute determination process. The details of the search expression generation process will be described later.

Next, the system control unit 14 performs a search process (step S3). In the search process, items for sale are searched for based on the generated search expression. Then, a search result list indicating a search result is generated. In the search result list, sale item IDs of found items for sale are registered. The details of the search process will be described later.

Next, the system control unit 14 generates an HTML document of a search result page (step S4). Specifically, the system control unit 14 acquires sale item information corresponding to the sale item IDs registered in the search result list from the sale item information DB 12c for each sale item ID. Next, the system control unit 14 generates data for displaying a search result display area based on the sale item information. Then, the system control unit 14 generates the HTML document including the data for displaying the search result display area. Here, if a plurality of search result lists are generated in a search main process, the system control unit 14 generates the data for displaying the search result display area for each search result list and generates an HTML document including each generated data. When a user inputs each of a plurality of category names of categories that are in a sibling relationship as a search word, a plurality of search result lists are generated. For example, for each search result list, the system control unit 14 sets information such as a sale item name, a sale item price, and a shop name of each found item for sale between table tags different from those of other search result lists. The information is an example of search object information of the present invention.

When the system control unit 14 generates the HTML document of the search result page, the system control unit 14 transmits the HTML document to the user terminal 3 that is the transmission source of the search request (step S5). After completing this process, the system control unit 14 ends the search request reception process. The user terminal 3 displays the search result page based on the received HTML document. When the HTML document is generated based on a plurality of search result lists, for example, as shown in FIG. 5, a plurality of search result display areas are displayed in the search result page. By performing steps S4 and S5, as a providing means, the system control unit 14 provides information of the found items for sale to the user terminal 3 so that pieces of the information of the found items for sale are separately displayed for respective search conditions corresponding to plurality of search words that are in a sibling relationship to each other in the category tree.

Figure 9:
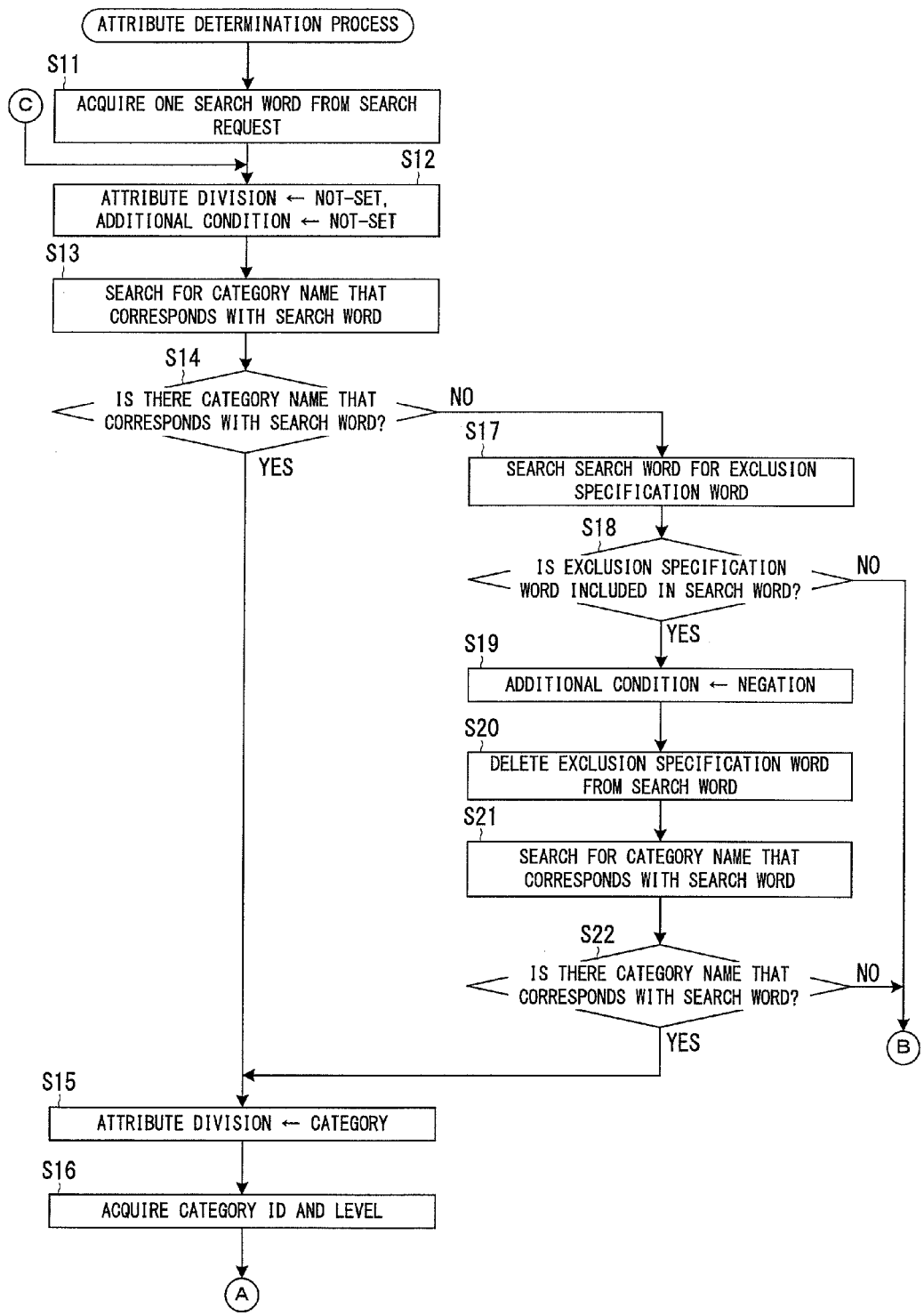
FIG. 9 is a flowchart showing a process example of an attribute determination process of the system control unit 14 of the online shopping mall server 1 according to the embodiment.

FIG. 9 is a flowchart showing a process example of the attribute determination process of the system control unit 14 of the online shopping mall server 1 according to the present embodiment.

As shown in FIG. 9, the system control unit 14 acquires one search word from the search request (step S11). Next, the system control unit 14 initializes an attribute division and an additional condition of the acquired search word. (Step S12)

Next, the system control unit 14 searches the category information DB 12b for a category name that corresponds with the acquired search word (step S13). There are category names formed by combining a plurality of names with "/". In this case, the system control unit 14 searches for a category name one of the plurality of names of which corresponds with the search word as a category name that correspond with the search word. For example, when the category name is "beauty/cosmetic/perfume water", if the search word is any one of "美容" ("beauty"), "コスメ" ("cosmetic"), and "香水" ("perfume water"), the search word and the category name correspond with each other.

Next, as a second determination means, the system control unit 14 determines whether or not there is a category name that corresponds with the acquired search word based on a search result (step S14). Even when an exclusion specification word is included in the search word, the system control unit 14 performs the search in a state in which the exclusion specification word is included in the search word. This is because a category name that includes the exclusion specification word may be registered in the category information DB 12b. For the same reason, even when a unit word is included in the search word, the system control unit 14 performs the search in a state in which the unit word is included in the search word.

If the system control unit 14 determines that there is a category name that corresponds with the search word (step S14: YES), the system control unit 14 sets the attribute division of the acquired search word to category (step S15). Next, the system control unit 14 acquires a category ID and a level from category information including the category name that corresponds with the search word (step S16). Then, the system control unit 14 stores the acquired category ID and level in the RAM 14c in association with the acquired search word. When the search word corresponds with a plurality of category names of categories, the system control unit 14 stores category IDs and levels of these categories in the RAM 14c.

In step S14, if the system control unit 14 determines that there is no category name that corresponds with the search word (step S14: NO), the system control unit 14 searches the search word for each exclusion specification word registered in the exclusion specification word DB 12d (step S17). Next, the system control unit 14 determines whether or not any of the exclusion specification words is included in the search word based on a search result (step S18). At this time, if the system control unit 14 determines that an exclusion specification word is included (step S18: YES), the system control unit 14 sets the additional condition of the acquired search word to negation (step S19). Next, the system control unit 14 deletes the exclusion specification word from the acquired search word (step S20). Next, the system control unit 14 searches the category information DB 12b for a category name that corresponds with the search word from which the exclusion specification word is deleted, (step S21). Then, as a second determination means, the system control unit 14 determines whether or not there is a category name that corresponds with the search word from which the exclusion specification word is deleted on the basis of a search result (step S22). At this time, if the system control unit 14 determines that there is a category name that corresponds with the search word from which the exclusion specification word is deleted (step S22: YES), the system control unit 14 proceeds to step S15.

Figure 10:
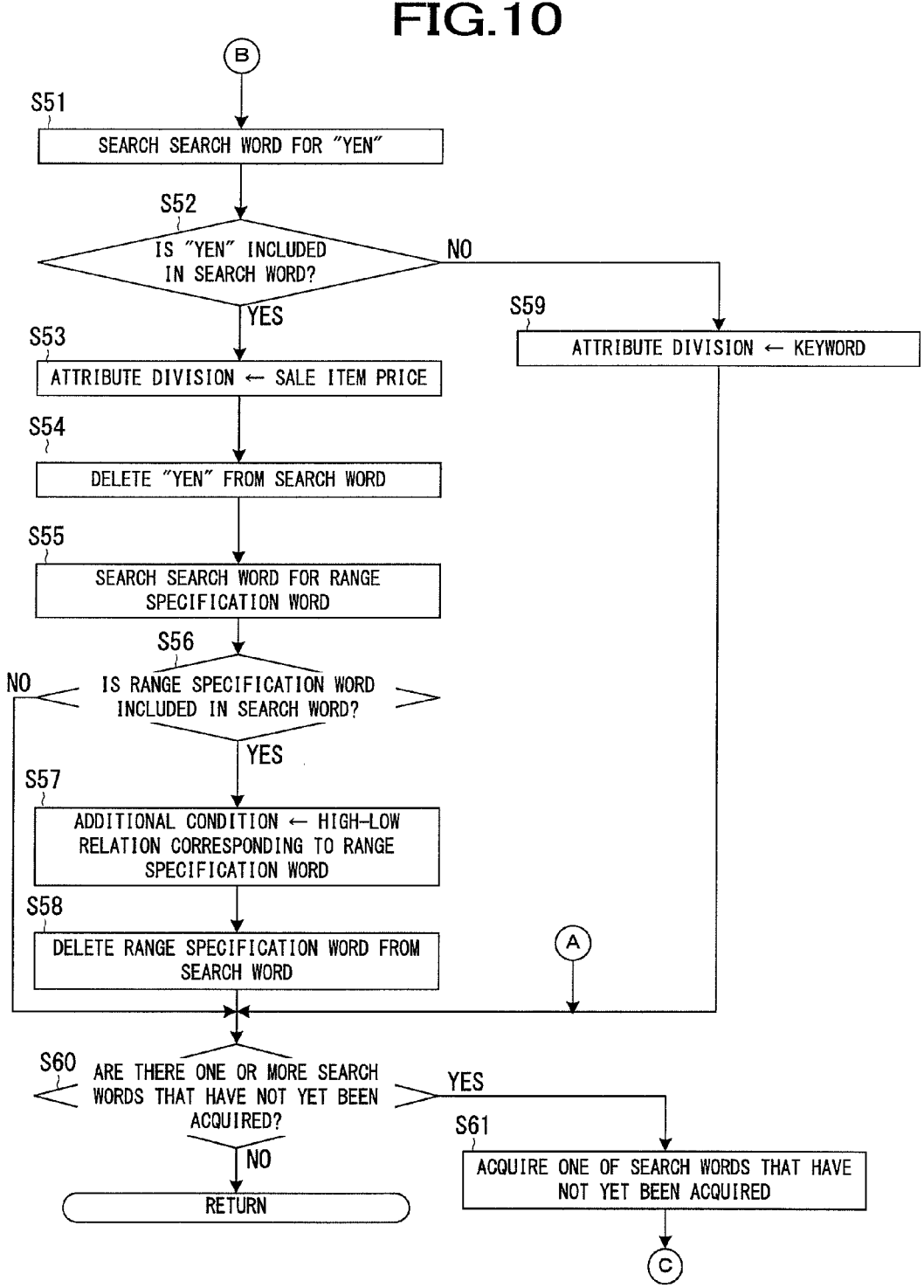
FIG. 10 is a flowchart showing a process example of the attribute determination process of the system control unit 14 of the online shopping mall server 1 according to the embodiment.

If the system control unit 14 determines that no exclusion specification word is included in step S18 (step S18: NO) or when the system control unit 14 determines that there is no category name that corresponds with the search word in step S22 (step S22: NO), as shown in FIG. 10, the system control unit 14 searches the acquired search word for a unit specification word registered in the unit specification word DB 12e (step S51). In the unit specification word DB 12e, "円" ("yen") is registered, so that the system control unit 14 searches the search word for "円". Next, the system control unit 14 determines whether or not "円" is included in the search word based on a search result (step S52). Thereby, as a first determination means, the system control unit 14 determines whether or not the search word is a word representing a sale item price. At this time, if the system control unit 14 determines that "円" is included in the search word (step S52: YES), the system control unit 14 sets the attribute division of the acquired search word to sale item price (step S53). In practice, it is set to the attribute label "pr" that is associated with "円" in the unit specification word DB 12e.

In the present embodiment, for ease of understanding, a search word including "円" is determined to be a search word representing an amount of money as a content of a sale item price. However, the system control unit 14 may determine whether or not the search word is a search word representing an amount of money by analyzing the search word in further detail. In other words, while the system control unit 14 uses a condition that the search word includes "円" as a minimum requirement to determine that the search word is a word representing a sale item price, the system control unit 14 may perform the determination by also using other requirements. For example, the system control unit 14 may determine whether or not the search word includes a number along with "円". Further, the system control unit 14 may determine whether or not a character format of the search word corresponds with a representation form of a sale item price. For example, the system control unit 14 may determine that the search word represents a sale item price when the search word starts with any one of characters "0" to "9", then a character "0"-"9", "千" ("thousand"), "万" ("10 thousand"), or the like appears 0 times or more, and thereafter "円" appears.

Next, the system control unit 14 deletes "円" from the acquired search word (step S54). Next, the system control unit 14 searches the search word from which "円" is deleted for each of the range specification words registered in the range specification word DB 12*f* (step S55). Next, the system control unit 14 determines whether or not any of the range specification words is included in the search word based on a search result (step S56). At this time, if the system control unit 14 determines that a range specification word is included (step S56: YES), the system control unit 14 sets the additional condition of the acquired search word to a high-low relation corresponding to the range specification word included in the search word (step S57). In practice, it is set to an additional condition label that is associated with the range specification word, in the range specification word DB 12*f*, included the search word. Next, the system control unit 14 deletes the range specification word from the search word (step S58).

When the range specification word is "–", the system control unit 14 divides the search word into a part before "–" and a part after "–", sets an additional condition label of the part before "–" to "mn", and sets an additional condition label of the part after "–" to "mx".

In step S52, if the system control unit 14 determines that "円" is not included in the search word (step S52: NO), the system control unit 14 sets the attribute division of the acquired search word to keyword (step S59).

If the system control unit 14 determines that no range specification word is included in the search word (step S56: NO) or when the system control unit 14 completes the process of step S16, S58, or S59, the system control unit 14 determines whether or not there are one or more search words that have not yet been acquired in the search request (step S60). At this time, if the system control unit 14 determines that there are one or more search words that have not yet been acquired (step S60: YES), the system control unit 14 acquires one of the search words that have not yet been acquired (step S61). Next, the system control unit 14 proceeds to step S12. The system control unit 14 determines an attribute division for each search word included in the search request by repeating the processes of steps S12 to S61. When the system control unit 14 determines that all the search words have been acquired (step S60: NO), the system control unit 14 ends the attribute determination process.

Figure 11:
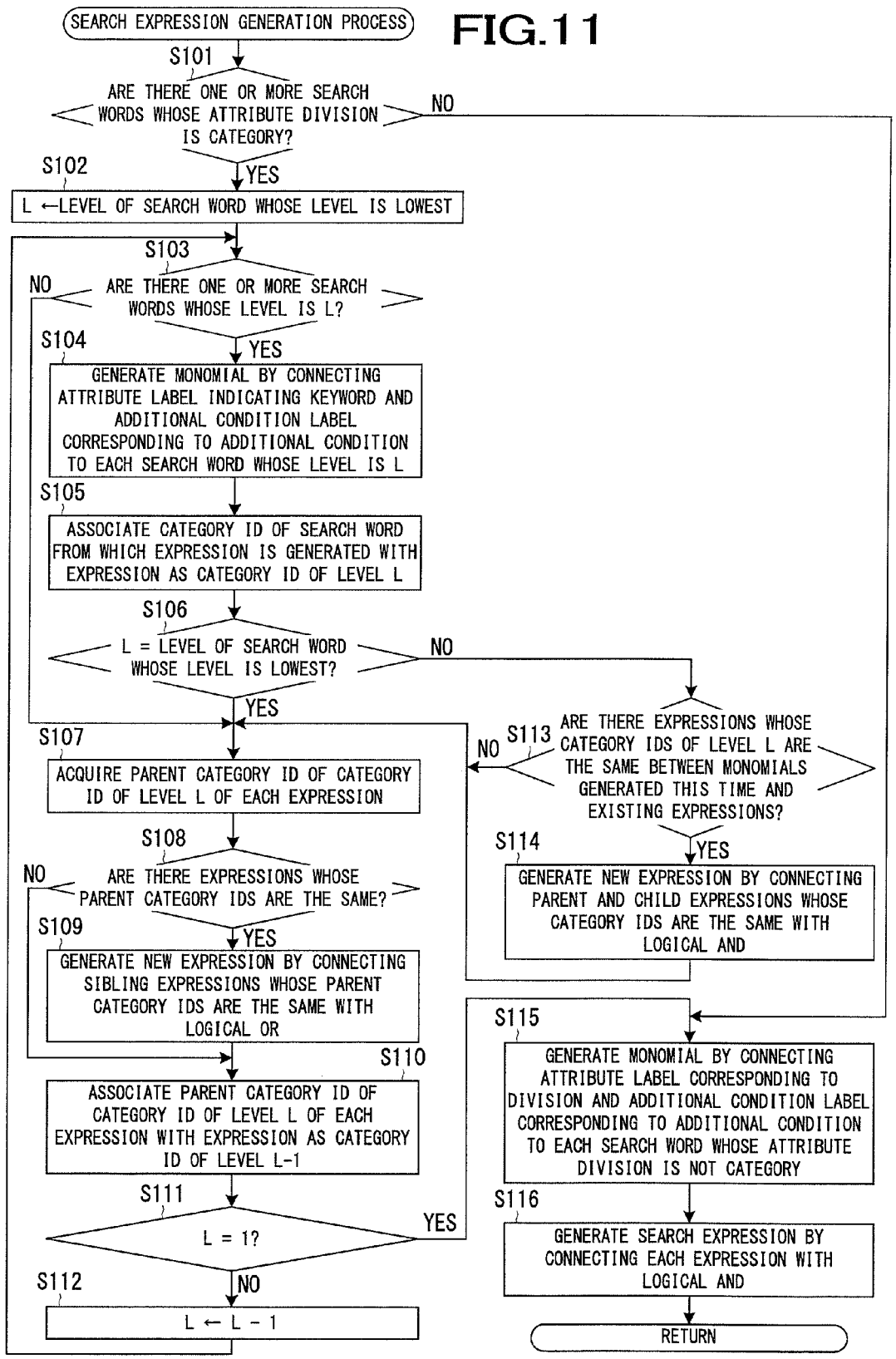
FIG. 11 is a flowchart showing a process example of a search expression generation process of the system control unit 14 of the online shopping mall server 1 according to an embodiment.

FIG. 11 is a flowchart showing a process example of a search expression generation process of the system control unit 14 of the online shopping mall server 1 according to the present embodiment.

As shown in FIG. 11, the system control unit 14 determines whether or not there are one or more search words whose attribute divisions are category among the search words whose attribute divisions are determined (step S101). At this time, if the system control unit 14 determines that there are one or more search words whose attribute divisions are category (step S101: YES), the system control unit 14 sets a level number L to the lowest level among levels associated with the search words whose attribute divisions are category (step S102). In the example of FIG. 3, the level 3 is the lowest level.

Next, the system control unit 14 determines whether or not there are one or more search words associated with the level L among the search words whose attribute divisions are category (step S103). When the level number L is the number of the lowest level, there are surely one or more search words associated with the level whose number is L. In the example of FIG. 3, the lowest level is associated with "G113", "G211", "G212", and "G222". At this time, if the system control unit 14 determines that there are one or more search words associated with the level L (step S103: YES), the system control unit 14 generates a monomial by connecting an attribute label indicating keyword and an additional condition label corresponding to the additional condition set in the attribute determination process to each search word associated with the level whose number is L (step S104). For example, it is assumed that the input search word is "AA産を除く" ("exclude AA growth"). In this case, "を除く" ("exclude") is deleted from the search word and the additional condition is negation. Therefore, the monomial is "kw:nt:AA産" ("kw:nt: AA growth"). When the input search word is "AA産" ("AA growth"), the monomial is "kw: AA産" ("kw:AA growth").

Next, for each generated monomial, the system control unit 14 associates a category ID associated with the search word, from which the monomial is generated, with the monomial as a category ID of the level L (step S105). Next, the system control unit 14 determines whether or not the level number L indicates the lowest level of the levels associated with the search words whose attribute division is category (step S106). At this time, if the system control unit 14 determines that the level number L indicates the lowest level (step S106: YES), the system control unit 14 acquires a category ID of the parent category of a category indicated by a category ID of the level L associated with each expression (step S107). Specifically, the system control unit 14 acquires a parent category ID corresponding to the category ID from the category information DB 12*b*. Next, the system control unit 14 determines whether or not there is a plurality of expressions whose category IDs of the parent categories are the same (step S108). At this time, if the system control unit 14 determines that there is a plurality of expressions whose category IDs of the parent categories are the same (step S108: YES), the system control unit 14 generates a new expression by combining the plurality of expressions with a logical OR operator (step S109). This is because a plurality of categories whose parent categories are the same are in a sibling relationship. Then, the system control unit 14 determines the new expression as an expression used to generate a search expression and removes the plurality of expressions, from which the new expression is generated, from the expression used to generate the search expression. In the example of FIG. 3, the parent categories of G211 and G212 are the same, so that "G211+G212" is newly generated.

Next, the system control unit 14 associates each category ID of the parent category acquired for each expression in step S107 with a corresponding expression as a category ID of level L−1 (step S110). In the example of FIG. 3, the category ID of G11 is associated with "–G113", the category ID of G21 is associated with "G211+G212", and the category ID of G22 is associated with "G222".

Next, the system control unit 14 determines whether or not the level number L is 1 (step S111). At this time, if the system control unit 14 determines that the level number L is not 1 (step S111: NO), the system control unit 14 subtracts 1 from the level number L (step S112). Next, the system control unit 14 proceeds to step S103.

In steps S103 to S105, the system control unit 14 performs processes in the same manner as when the level number L indicates the lowest level. In the example of FIG. 3, the level 2 is associated with "G13". Therefore, a monomial "G13" is generated. Further, the category ID of G13 is associated with the "G13".

Next, if the system control unit 14 in step S106 determines that the level number L does not indicate the lowest level (step S106: NO), the system control unit 14 determines whether or not there are expressions whose category IDs of level L associated with the expressions are the same between the monomials generated this time and the expressions that have already been generated before (step S113). In other words, the system control unit 14 determines whether or not there are one or more categories, among categories of level L+1 associated with expressions that have already been generated before, whose parent category is a category of level L associated with the monomials generated this time. In the example of FIG. 3, there is no such expressions in a stage of level 2. At this time, if the system control unit 14 determines that there are expressions whose category IDs of level L associated with the expressions are the same between the monomials generated this time and the expressions that have already been generated before (step S113: YES), the system control unit 14 generates a new expression by combining a plurality of expressions whose category IDs of level L associated with the expressions are the same between the monomials generated this time and the expressions that have already been generated before with a logical AND operator (step S114). Then, the system control unit 14 determines the new expression as an expression used to generate the search expression and removes the plurality of expressions, from which the new expression is generated, from the expression used to generate the search expression.

If the system control unit 14 determines that there are not expressions whose category IDs of level L associated with the expressions are the same between the monomials generated this time and the expressions that have already been generated before (step S113: NO) or when the system control unit 14 completes the process of step S114, the system control unit 14 proceeds to step S107.

In step S103, if the system control unit 14 determines that there is no search word associated with the level L (step S103: NO), the system control unit 103 does not perform the processes of steps S104 to S106 and proceeds to step S107.

In steps S107 to S111, the system control unit 14 performs processes in the same manner as when the level number L indicates the lowest level. In the example of FIG. 3, the category ID of G1 that is the parent category of G13 is acquired for "−G113". The category ID of G2 that is the parent category of G21 is acquired for "G211+G212". The category ID of G2 that is the parent category of G22 is acquired for "G222". The category ID of G1 that is the parent category of G13 is acquired for "G13". The acquired category IDs are the same between "−G113" and "G13", so that "−G113+G13" is generated. The category ID of G1 is associated as the category ID of level 1 of this expression. In the same manner, "(G211+G212)+G222" is generated. The category ID of G2 is associated as the category ID of level 1 of this expression.

In this way, the system control unit 14 repeats the processes of steps S102 to S114 until the level number L becomes 1. In the example of FIG. 3, when the level number L becomes 1, a monomial "G1" is generated in steps S103 to S105. Further, the category ID of G1 is associated with the "G1". In step S113, the category ID of level 1 is the same between "G1" which is the monomial generated this time and "−G113+G13" which is the expression that has already been generated before. Therefore, in step S114, "(−G113+G13)*G1" is generated. The category of level 0, which is the parent category of level 1, is only the category top. Therefore, in step S108, the category ID of the parent category is the same for all the expressions. Therefore, in step S109, "((−G113+G13)*G1+((G211+G212)+G222)" is generated.

In this way, when there is a plurality of search words representing categories, as a decision means, the system control unit 14 decides a method that combines search conditions corresponding to respective search words based on the positional relationship between the search words in the category tree. Specifically, in steps S108 and S109, when search words are in a sibling relationship with each other in the category tree, the system control unit 14 decides to combine search conditions corresponding to respective search words with logical OR. Further, when search words are neither in a sibling relationship nor in an ancestor-descendant relationship in the category tree, the system control unit 14 decides to combine search conditions corresponding to respective search words with logical OR. Further, in steps S113 and S114, when a certain search word is an ancestor of at least another search word, the system control unit 14 decides to combine a search condition corresponding to the ancestor search word and a search condition corresponding to the descendant search word with logical AND.

In step S111, if the system control unit 14 determines that the level number L is 1 (step S111: YES), the system control unit 14 generates a monomial by connecting an attribute label corresponding to an attribute division and an additional condition label corresponding to an additional condition to each search word whose attribute division is not category among the search words whose attribute divisions are determined (step S115). For example, when the input search word is "XXX", "kw:XXX" is generated. For example, when the input search word is "1000 円より安い" ("lower than 1000 thousand yen"). "pr:lt:1000" is generated.

Next, the system control unit 14 connects the monomials generated in step S115 and the expression finally generated in steps S102 to S114 with logical AND operators and generates a search expression (step S116). After completing this process, the system control unit 14 ends the search expression generation process.

When a search word corresponds with category names of a plurality of categories in the attribute determination process, as described above, the system control unit 14 may assign a categories to the search word so that a plurality of categories represented by the search word and a category represented by another search word are in a sibling relationship or a parent-child relationship. Then, the system control unit 14 may generate a search expression based on the assignment of categories.

Figure 12:
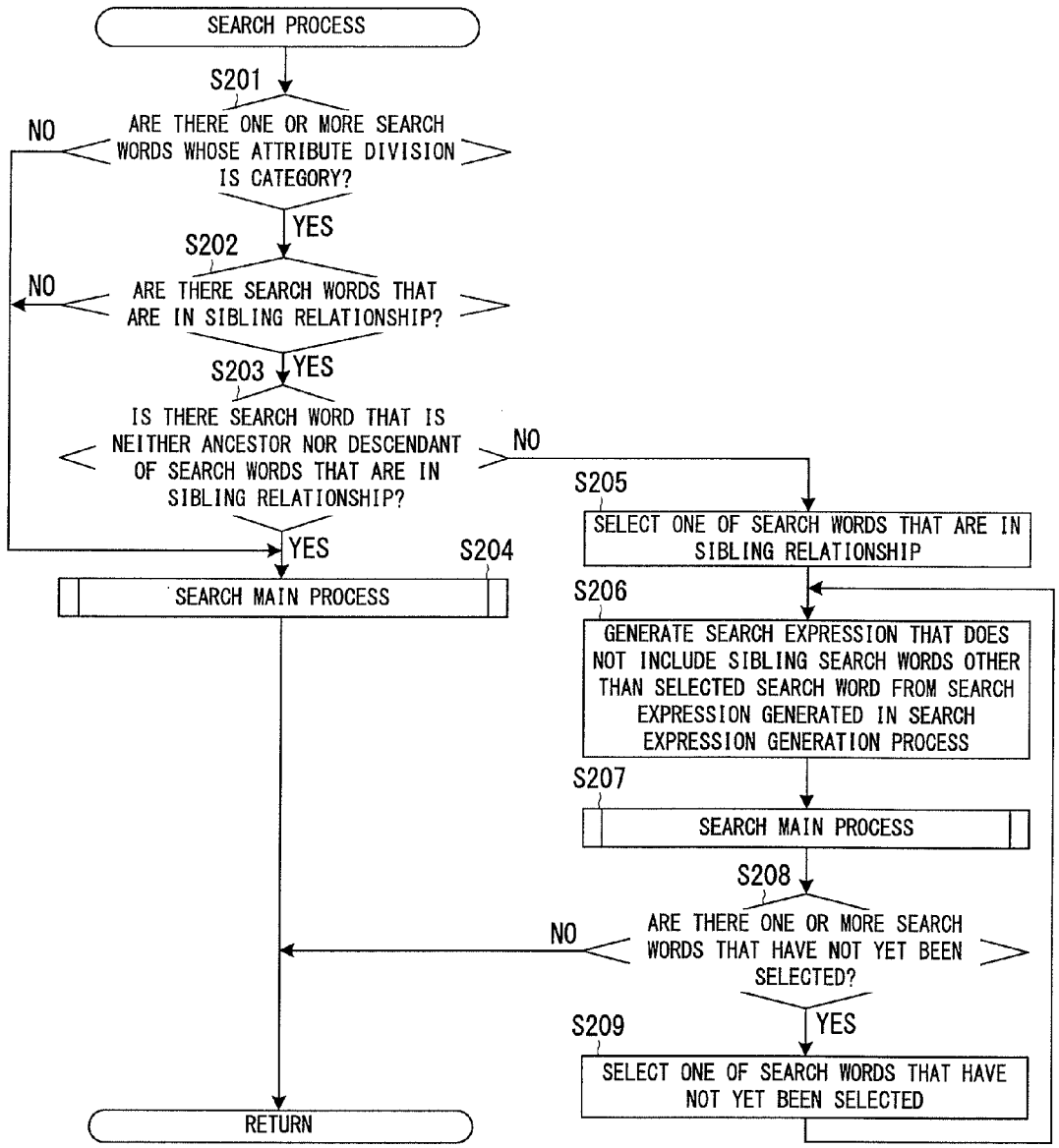
FIG. 12 is a flowchart showing a process example of a search process of the system control unit 14 of the online shopping mall server 1 according to the embodiment.

FIG. 12 is a flowchart showing a process example of the search process of the system control unit 14 of the online shopping mall server 1 according to the present embodiment.

As shown in FIG. 12, the system control unit 14 determines whether or not there are one or more search words whose attribute divisions are category among the search words whose attribute divisions are determined in the attribute determination process (step S201). At this time, if the system control unit 14 determines that there is no search word whose attribute division is category (step S201: NO), the system control unit 14 performs a search main process (step S204). In the search main process, a search corresponding to one search expression is performed. In this case, the search expression generated in the search expression generation process is used in the search main process without change.

On the other hand, if the system control unit 14 determines that there are one or more search words whose attribute divisions are category (step S201: YES), the system control unit 14 determines whether or not there is a plurality of search words whose categories are in a sibling relationship among the search words whose attribute divisions are category (step S202). The determination is performed based on the category ID associated with each search word and the category information DB 12b. At this time, if the system control unit 14 determines that there is not a plurality of search words whose categories are in a sibling relationship (step S202: NO), the system control unit 14 proceeds to step S204.

On the other hand, if the system control unit 14 determines that there is a plurality of search words whose categories are in a sibling relationship (step S202: YES), the system control unit 14 determines whether or not there is a search word, among the search words whose attribute division is category, that is neither an ancestor nor a descendant of the plurality of search words that are in a sibling relationship (step S203). The determination is performed based on the category ID associated with each search word and the category information DB 12b. At this time, if the system control unit 14 determines that there is a search word that is neither an ancestor nor a descendant of the plurality of search words that are in a sibling relationship (step S203: YES), the system control unit 14 proceeds to step S204. After performing step S204, the system control unit 14 ends the search process.

On the other hand, if the system control unit 14 determines that there is no search word that is neither an ancestor nor a descendant of the plurality of search words that are in a sibling relationship (step S203: NO), the system control unit 14 selects one of the plurality of search words that are in a sibling relationship (step S205). Next, the system control unit 14 generates a search expression by deleting, from the search expression generated in the search expression generation process, one or more search words except for the selected search word among the plurality of search words that are in a sibling relationship (step S206). For example, in the examples of FIGS. 4D to 4F, when "A社" ("A company") is selected, the search expression shown in FIG. 4E is generated. Next, the system control unit 14 performs the search main process (step S207). In this case, the search expression generated in step S206 is used in the search main process.

Next, the system control unit 14 determines whether or not there are one or more search words that have not yet been selected among the plurality of search words that are in a sibling relationship (step S208). At this time, if the system control unit 14 determines that there are one or more search words that have not yet been selected (step S208: YES), the system control unit 14 selects one of the search words that have not yet been selected (step S209). Next, the system control unit 14 proceeds to step S206. The system control unit 14 searches for items for sale for each of the plurality of search words that are in a sibling relationship by repeating the processes of steps S206 to S209. When the system control unit 14 determines that all the search words have been selected (step S208: NO), the system control unit 14 ends the search process.

Figure 13:
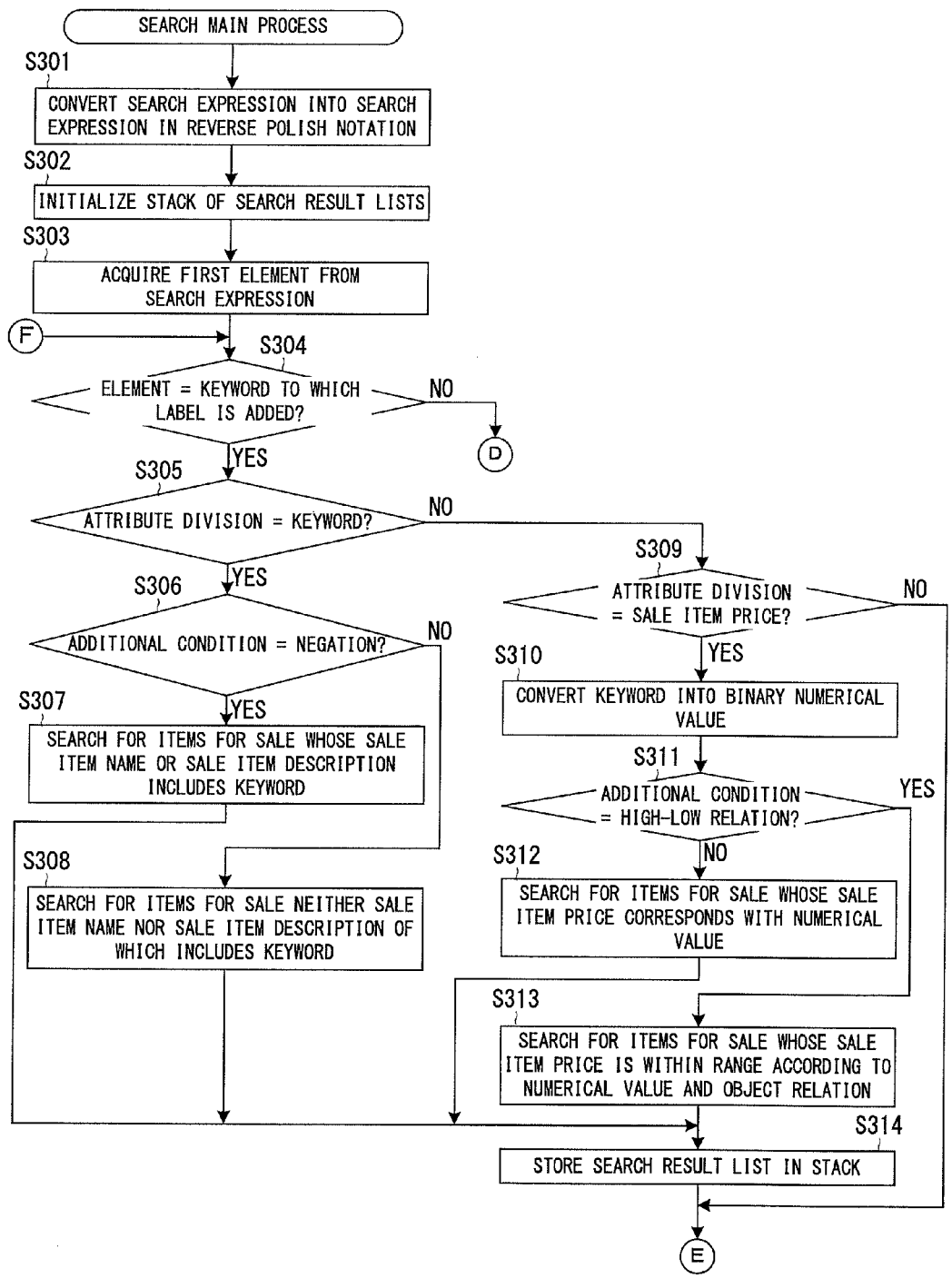
FIG. 13 is a flowchart showing a process example of a search main process of the system control unit 14 of the online shopping mall server 1 according to the embodiment.
Figure 14:
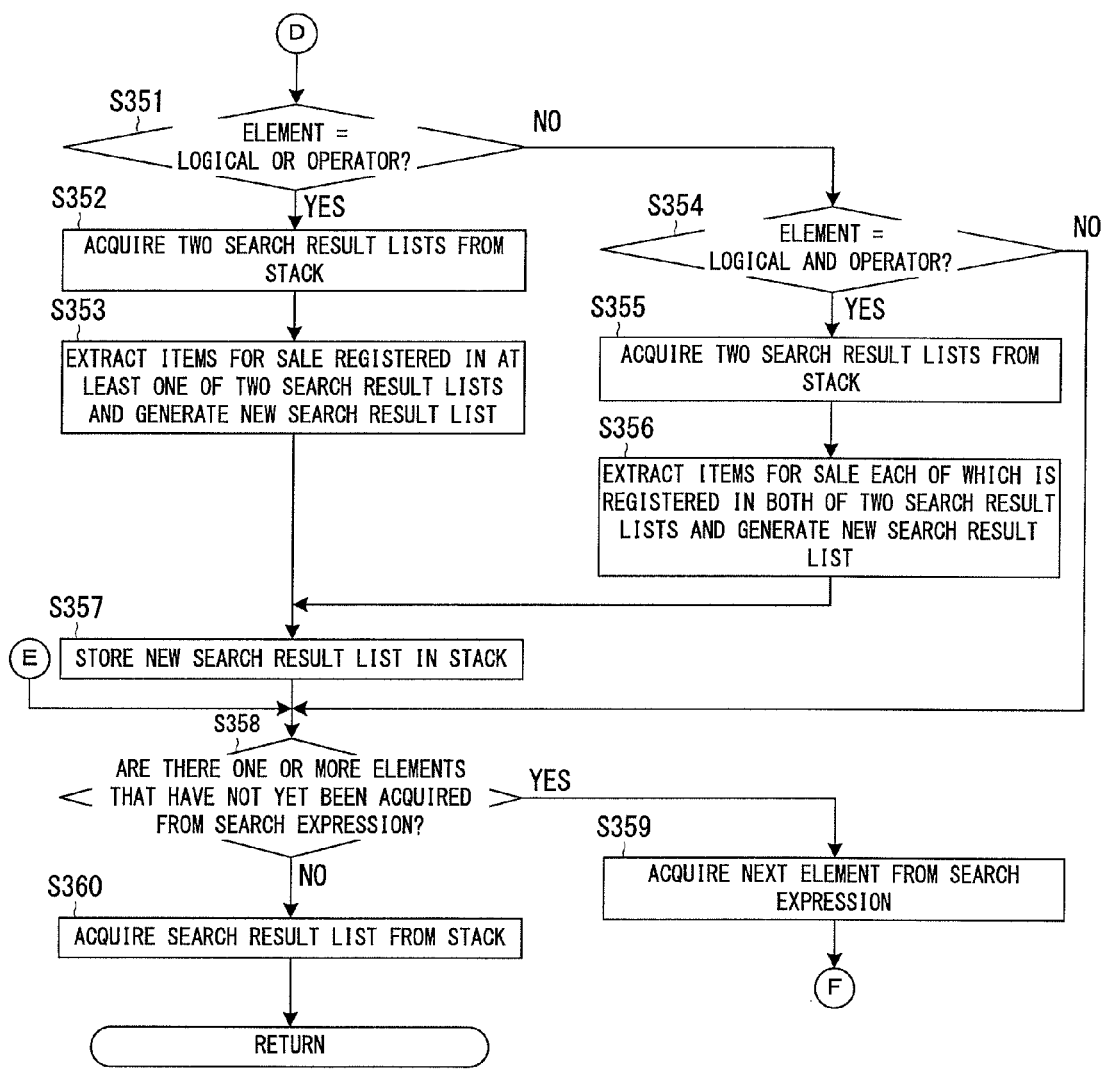
FIG. 14 is a flowchart showing a process example of the search main process of the system control unit 14 of the online shopping mall server 1 according to the embodiment.

FIGS. 13 and 14 are flowcharts showing a process example of the search main process of the system control unit 14 of the online shopping mall server 1 according to the present embodiment.

As shown in FIG. 13, the system control unit 14 converts the search expression into a search expression in Reverse Polish notation (step S301). For example, the search expression shown in FIG. 4B is converted into "kw:コシヒカリkw:nt:AA産*kw:XXX*pr:mn:2000*pr:mx:5000*" ("kw:koshihikari kw:nt:AA growth*kw:XXX*pr:mn:2000*pr:mx:5000*"). The reason why the search expression is represented in Reverse Polish notation is to easily perform the search process. Specifically, if elements are sequentially acquired from the top of the search expression and processes are performed in order of acquisition of the elements, a search process according to the search expression can be performed. Here, the elements are monomials and logical operators. The monomial is a search word with a label attached. In the example shown in FIG. 4B, first, items for sale are searched for using "kw:コシヒカリ" ("kw:koshihikari"), and then, items for sale are searched for using "kw:nt:AA産" ("kw:nt:AA growth"). Next, an intersection of a set of items for sale found by "kw:コシヒカリ" and a set of items for sale found by "kw:nt:AA産" is extracted. Next, items for sale are searched for using "pr:mn:2000", and then, an intersection of the set of items for sale extracted previously and a set of items for sale found by "kw:nt:AA産" is extracted based on "*". Thereafter, processes are performed in the same manner.

After converting the search expression, the system control unit 14 initializes a stack of the search result lists (step S302). The stack is a data structure for storing the search result lists in last-in first-out method.

Next, the system control unit 14 acquires the first element from the search expression (step S303). Next, the system control unit 14 determines whether or not the acquired element is a monomial (step S304). At this time, if the system control unit 14 determines that the acquired element is a monomial (step S304: YES), the system control unit 14 determines whether or not the attribute division of the search word included in the acquired element is keyword (step S305). Specifically, the system control unit 14 determines whether or not the acquired element includes "kw:". At this time, if the system control unit 14 determines that the attribute division is keyword (step S305: YES), the system control unit 14 determines whether or not the additional condition of the search word included in the acquired element is negation (step S306). Specifically, the system control unit 14 determines whether or not the acquired element includes "nt:". At this time, if the system control unit 14 determines that the additional condition is not negation (step S306: NO), the system control unit 14 searches the sale item information DB 12c for sale item information in which at least one of the sale item name and the sale item description includes the search word included in the acquired element (step S307). In this way, as a search means, the system control unit 14 performs the search by using a search word, which is not determined to be a word representing an amount of money, as a keyword.

On the other hand, if the system control unit 14 determines that the additional condition is negation (step S306: YES), the system control unit 14 searches the sale item information DB 12c for sale item information in which neither the sale item name nor the sale item description includes the search word included in the acquired element (step S308). In this way, when an input search word includes an exclusion specification word, as a search means, the system control unit 14 performs the search by using, as a search condition, negation of the condition corresponding to the search word.

In step S305, if the system control unit 14 determines that the attribute division is not keyword (step S305: NO), the system control unit 14 determines whether or not the attribute division of the search word included in the acquired element is sale item price (step S309). Specifically, the system control unit 14 determines whether or not the acquired element includes "pr:". At this time, if the system control unit 14 determines that the attribute division is not sale item price (step S309: NO), the system control unit 14 proceeds to step S358.

On the other hand, if the system control unit 14 determines that the attribute division is sale item price (step S309: YES), the system control unit 14 converts the search word included in the acquired element into a binary numerical value (step S310). Next, the system control unit 14 determines whether or not the additional condition of the search word included in the acquired element is a high-low relation (step S311). Specifically, the system control unit 14 determines whether or not the acquired element includes any of "mn:", "mx:", "gt:", and "lt:". At this time, if the system control unit 14 determines that the additional condition is not a high-low relation (step S311: NO), the system control unit 14 searches the sale item information DB 12c for sale item information where the sale item price corresponds with the converted numerical value (step S312). In this way, as a search means, the system control unit 14 searches for items for sale by using a search word which is determined to be a word representing an amount of money as a search condition of sale item price.

On the other hand, if the system control unit 14 determines that the additional condition is a high-low relation, the system control unit 14 searches the sale item information DB 12c for sale item information where the sale item price is within a range according to the converted numerical value and the high-low relation indicated by the additional condition label included in the acquired element (step S313). For example, it is assumed that the numerical value is K. Further, it is assumed that the additional condition label is "mn:". In this case, the system control unit 14 searches for sale item information where the sale item price is K yen or more. When the additional condition label is "mx:", the system control unit 14 searches for sale item information where the sale item price is K yen or less. When the additional condition label is "gt:", the system control unit 14 searches for sale item information where the sale item price is higher than K yen. When the additional condition label is "lt:", the system control unit 14 searches for sale item information where the sale item price is lower than K yen. In this way, when an input search word includes a range specification word, as a search means, the system control unit 14 searches for items for sale whose sale item price is included in a range of an amount of money represented by the input search word.

After completing the process of step S307, S308, S312, or S313, the system control unit 14 acquires sale item IDs from each piece of found sale item information and generates a search result list in which the acquired sale item IDs are registered. Then, the system control unit 14 stores the search list in the stack (step S314). Next, the system control unit 14 proceeds to step S358.

In step S304, if the system control unit 14 determines that the acquired element is not a monomial (step S304: NO), as shown in FIG. 14, the system control unit 14 determines whether or not the acquired element is a logical OR operator (step S351). At this time, if the system control unit 14 determines that the acquired element is a logical OR operator (step S351: YES), the system control unit 14 acquires two search result lists from the stack (step S352). Next, the system control unit 14 extracts sale item IDs registered in at least one of the two acquired search result lists. Then, the system control unit 14 newly generates a search list in which the extracted sale item IDs are registered (step S353).

On the other hand, if the system control unit 14 determines that the acquired element is not a logical OR operator (step S351: NO), the system control unit 14 determines whether or not the acquired element is a logical AND operator (step S354). At this time, if the system control unit 14 determines that the acquired element is a logical AND operator (step S354: YES), the system control unit 14 acquires two search result lists from the stack (step S355). Next, the system control unit 14 extracts sale item IDs each of which is registered in both acquired search result lists. Then, the system control unit 14 newly generates a search list in which the extracted sale item IDs are registered (step S356).

After completing the process of step S353 or S356, the system control unit 14 stores the newly generated search result list in the stack (step S357). Next, the system control unit 14 determines whether or not there are one or more elements that have not yet been acquired from the search expression (step S358). At this time, if the system control unit 14 determines that there are one or more elements that have not yet been acquired (step S358: YES), the system control unit 14 acquires the next element from the search expression (step S359). Next, the system control unit 14 proceeds to step S304. The system control unit 14 acquires elements sequentially from the top of the search expression and performs a process according to the acquired element by repeating the processes of steps S304 to S314 and steps S351 to S359. If the system control unit 14 determines that all the elements have been acquired (step S358: NO), the system control unit 14 acquires a search result list from the stack (step S360). This search result list indicates the final search result list. After completing this process, the system control unit 14 ends the search main process.

As described above, according to the present embodiment, the system control unit 14 of the online shopping mall server 1 determines whether or not a search word is a word that represents a content of attribute of a predetermined division based on the search word itself for each of a plurality of search words input in the search word input field 111 and searches for items for sale by using a content represented by a search word determined to be a word that represents a content of attribute of a predetermined division as a search condition of attribute of the predetermined division. Therefore, a user can specify a search condition of attribute of a predetermined division by inputting a plurality of search words including a search word representing a content of attribute in one search word input field 111 without performing an operation to specify the division of attribute.

Further, the system control unit 14 determines that a search word meeting a minimum requirement that the search word includes at least "円" ("yen") is a word that represents an amount of money and uses the amount of money represented by the search word determined to be a word that represents an amount of money as a search condition of a sale item price. Therefore, the user can specify a search condition of a sale item price by inputting a search word including "円".

Further, when the search word determined to be a word that represents an amount of money includes a range specification word, the system control unit 14 searches for items for sale whose sale item price is included in a range of amounts of money represented by the input search word. Therefore, the user can specify a range of sale item prices as a search condition of a sale item price by inputting a search word including "円" and a representation specifying a range.

Further, the system control unit 14 determines whether or not each of a plurality of search words input in the search word input field 111 corresponds with at least one of category names stored in the storage unit 12 that stores category names in a tree structure for each category, and if there is a plurality of search words determined to correspond with at least one of the category names, the system control unit 14 decides a method of combining search conditions corresponding to respective words on the basis of positional relationship between these search words in the category tree. Therefore, the user can specify a method of combining search conditions corresponding to respective categories name by inputting a plurality of category names. In other words, the user can specify a method of combining search conditions even if the user does not perform an operation other than the input operation to the search word input field 111.

Further, when search words are in a sibling relationship in the category tree, the system control unit 14 decides to combine search conditions corresponding to respective search words with logical OR. Therefore, the user can specify to combine search conditions with logical OR by inputting a plurality of category names that are in a sibling relationship to each other.

Further, the system control unit 14 searches for items for sale for each search condition corresponding to each of a plurality of search words that are in a sibling relationship to each other in the category tree and transmits an HTML document including information of the found items for sale to the user terminal 3 so that pieces of the information of the found items for sale are separately displayed for the respective search words that are in a sibling relationship. Therefore, search results corresponding to respective plurality of category names that are in a sibling relationship to each other are separately displayed. Thus, it is easy to compare search results between category names that are in a sibling relationship.

Further, when a certain search word is an ancestor of at least another search word, the system control unit 14 decides to combine a search condition corresponding to the ancestor search word and a search condition corresponding to the descendant search word with logical AND. Therefore, the user can specify to combine search conditions with logical AND by inputting a plurality of category names that are in an ancestor-descendant relationship to each other.

Further, the system control unit 14 determines that a search word determined to correspond with a category name is a keyword and determines a search condition that the keyword is included in at least one of a sale item name and a sale item description which are stored in the storage unit 12 which stores the sale item name and the sale item description for each item for sale. Therefore, even when a category indicated by a category ID included in sale item information is different from an actual category of an item for sale, it is possible to search for items for sale belonging to a category represented by a category name input by a user as a search word. In other words, even if a shop does not set a category of an item for sale correctly when registering sale item information, it is possible to search for items for sale that belong to a category represented by a search word. Further, even if the sale item information is configured so as not to include a category ID, it is possible to search for items for sale that belong to a category represented by a search word.

Further, when an input search word includes an exclusion specification word, the system control unit 14 performs a search by using negation of the condition corresponding to the search word as a search condition. Therefore, a user can specify a search condition of negation by inputting a search word including a representation indicating exclusion. Specifically, a keyword is formed by removing an exclusion specification word from a search word and items for sale can be searched for which meet a condition that neither the sale item name nor the sale item description includes the keyword.

Further, the system control unit 14 determines that a search word that is not determined to be a word representing a content of attribute of a predetermined division is a keyword and can be searched for a search condition that the keyword is included in at least one of the sale item name and the sale item description which are stored in the storage unit 12. Therefore, a user can specify a search condition of attribute of a predetermined division and a keyword by inputting a plurality of search words including a search word that represents a content of attribute of a predetermined division and a search word that does not represent a content of attribute of a predetermined division.

In the embodiment described above, the online shopping mall server 1 checks positional relationships between the search words in the tree structure based on the category information registered in the category information DB 12b. In other words, the positional relationships between the search words are checked based on the tree structure determined by an administrator or the like of the online shopping mall. However, the category information may be generated based on a web page of a website other than the online shopping mall and the generated category information may be registered in, for example, the category information DB 12b or a database different from the category information DB 12b. Then, the system control unit 14 may check the positional relationships between the search words in the tree structure based on the registered category information. In this case, the generation and the registration of the category information may be performed by, for example, the online shopping mall server 1 or an information processing device other than the online shopping mall server 1. As an acquisition source of the web page, for example, there is a website of encyclopedia. In the website of encyclopedia, for example, links to other web pages are embedded in each web page. Items in the other web pages are related to an item described in the web page. In this case, for example, an item described in the web page is assumed to be a parent category of an item related to the item described in the web page. The tree structure of categories is identified based on the links in each web page in the website of encyclopedia. An insufficient portion of the category information generated based on the tree structure determined by the administrator or the like of the online shopping mall may be compensated by the category information generated based on the web pages acquired from another website.

In the embodiment described above, even when the user inputs a category name as a search word, the online shopping mall server 1 uses the search word as a keyword in a keyword search. However, when a plurality of category names are input as search words, the online shopping mall server 1 may use a category represented by at least one search word as a search condition for a category of items for sale. Thereby, it is possible to search for items for sale belonging to a category represented by a search word.

For example, when two categories which are represented by two respective search words are in an ancestor-descendant relationship, the online shopping mall server 1 may use the category represented by the ancestor search word as a search condition for a category of items for sale and use the descendant search word as a keyword. In other words, the online shopping mall server 1 searches for items for sale meeting a condition that at least one of the sale item name and the sale item description includes the search word representing the descendant category from among items for sale belonging to the ancestor category. Specifically, when the system control unit 14 combines the monomials generated this time and the expressions that have already been generated with logical AND operators in the process of S114 of the search expression generation process shown in FIG. 11, the system control unit 14 changes the attribute labels included in the monomials generated this time to attribute labels representing category. Further, the system control unit 14 changes the search words included in the monomials to category IDs of categories represented by the search words. For example, when "kw:コシ ヒカリ" ("kw:koshihikari") and "kw:AA産" ("kw:AA growth") are combined and a new expression is generated, "gl:12345689*kw:AA産" ("gl:12345689*kw:AA growth") is generated. Here, "gl:" is an attribute label representing category. "12345689" is the category ID of "koshihikari".

Figure 15:
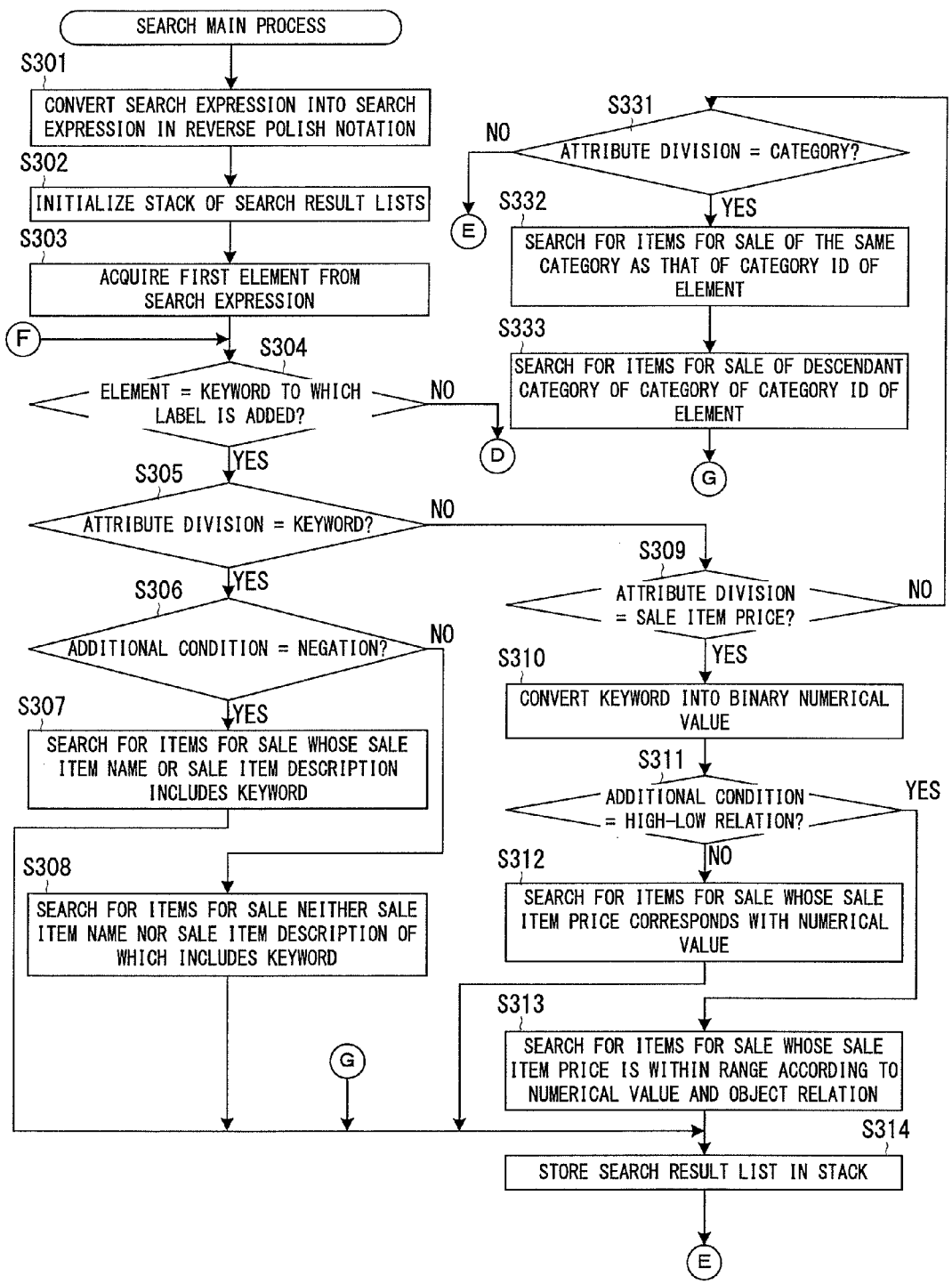
FIG. 15 is a flowchart showing a process example of a search main process of the system control unit 14 of the online shopping mall server 1 according a modified example of the embodiment.

FIG. 15 is a flowchart showing a process example of the search main process of the system control unit 14 of the online shopping mall server 1 according a modified example of the present embodiment. In FIG. 15, the same processes as those in FIG. 13 are denoted by the same reference numerals.

In step S309 of the search main process shown in FIG. 15, if the system control unit 14 determines that the attribute division is not sale item price (step S309: NO), the system control unit 14 determines whether or not the attribute division of the acquired element is category (step S331). Specifically, the system control unit 14 determines whether or not the acquired element includes "gl:". At this time, if the system control unit 14 determines that the attribute division is not category (step S331: NO), the system control unit 14 proceeds to step S358. On the other hand, if the system control unit 14 determines that the attribute division is category (step S331: YES), the system control unit 14 searches for items for sale belonging to the category indicated by the category ID included in the acquired element. First, the system control unit 14 searches the sale item information DB 12c for sale item information that includes the same category ID as that included in the acquired element (step S332). In other words, the system control unit 14 searches for items for sale belonging to the same category as that represented by the category name input by the user. Next, the system control unit 14 searches the sale item information DB 12c for sale item information that includes a category ID of a descendant category of the category indicated by the category ID included in the acquired element (step S333). In other words, the system control unit 14 searches for items for sale belonging to a descendant category of the category represented by the category name input by the user. Specifically, the system control unit 14 acquires category IDs of all ancestors of the category indicated by the category ID included in the sale item information. The parent category ID is registered in the category information registered in the category information DB 12b. Therefore, the system control unit 14 can acquire the category ID of the parent category. Further, the system control unit 14 can acquire the category ID of the parent category of the parent category from the category information of the parent category. In this way, the system control unit 14 acquires the category IDs of the ancestors. Next, the system control unit 14 determines whether or not any one of the acquired category IDs of all the ancestors corresponds with the category ID included in the acquired element. At this time, the sale item information where the category ID of any one of ancestors corresponds with the category ID included in the element is sale item information including a category ID of a descendant category of the category indicated by the category ID included in the acquired element. The system control unit 14 performs such a process for each piece of sale item information registered in the sale item information DB 12c. Next, the system control unit 14 acquires sale item IDs from each piece of sale item information found in steps S332 and S333 and generates a search result list in which the acquired sale item IDs are registered. Then, the system control unit 14 stores the search list in the stack (step S314). The processes after step S351 are the same as those in FIG. 14.

Regarding all the search words input as category names by the user, the online shopping mall server 1 may use categories represented by the search words as search conditions of categories of items for sale. Specifically, when the system control unit 14 generates a monomial in step S104 in the search expression generation process shown in FIG. 11, the system control unit 14 generates the monomial by connecting the attribute label representing category and the category ID of the category represented by the search word. The search main process may be the same as that shown in FIGS. 14 and 15. In this case, it is possible to specify a search condition for a category of items for sale and a sale item price. In other words, search conditions can be specified for a plurality of attributes of an item for sale. Therefore, in the attribute determination process, as a first determination means, the system control unit 14 determines whether or not an input search word represents an attribute value for each of a plurality of attributes for which a search condition can be specified. In other words, the system control unit 14 determines an attribute whose attribute value is represented by the input search word.

In the embodiment described above, the online shopping mall server 1 performs both of a process to determine a content of an attribute represented by a search word to be a search condition for an attribute of an item for sale and a process to decide a logical operation based on the positional relationships in the category tree or categories represented by search words. However, the online shopping mall server 1 may perform only either one of them.

In the embodiment described above, in the search condition setting area 110, the search word input field 111 and the search button 112, which are only widgets required to input search words, are displayed. However, in the search condition setting area 110, widgets required to specify detailed search conditions may be displayed. For example, a pull-down menu may be displayed to specify a category and thereby narrow down items for sale to be searched for. Further, when a plurality of search words are input in the search word input field 111, a pull-down menu may be displayed to select searching for items for sale whose sale item names and/or sale item descriptions include all the search words or searching for items for sale whose sale item names and/or sale item descriptions include at least one of the search words. Further, input fields to specify each of an upper limit value and a lower limit value of a sale item price may be displayed. When a user specifies a search condition by operating a widget to specify a search condition, the online shopping mall server 1 may search for items for sale by using the specified search condition and using all search words input in the search word input field 111 as keywords. On the other hand, when a user inputs search words in the search word input field 111 without operating a widget to specify a search condition, as in the embodiment described above, the online shopping mall server 1 may determine whether or not each search word represents an attribute value and perform a search by using a search word as a search condition for an attribute of items for sale according to a determination result. In other words, it is within the scope of the present invention to input a plurality of search words in the search word input field 111 among a plurality of widgets to specify a search condition.

A method of combining a plurality of search conditions is not limited to logical AND and logical OR. For example, exclusive OR may be used.

In the embodiment described above, the present invention is applied to searching for items for sale that are sold in the online shopping mall. However, the present invention may be applied to searching for items for sale that are put on sale in an auction. Further, the present invention may be applied to searching for services, web pages, images, moving images, sounds, maps, news, blogs, and the like.

In the embodiment described above, the sale item price is described as an example of an attribute represented by a numerical value in some kind of unit. However, the present invention may be applied to, for example, a currency unit of countries other than Japan and/or units such as weight, length, volume, time, amount of data, and/or the like. Examples of unit word include "g", "m", "l", "秒" ("s"), and "B". There may be a plurality of such attributes. In the unit word DB 12e, for example, a unit word and a label indicating a division of attribute associated in advance with the unit word is registered in association with each other.

In the embodiment described above, attributes that are hierarchically defined in a tree structure are applied to categories. However, the present invention may be applied to an attribute other than category. Further, there may be a plurality of such attributes.

Among attributes of search objects, there is an attribute for which a content of the attribute is set to one candidate selected from a plurality of candidates different from each other. For example, as a state of an item for sale that are put on sale in an auction, there are brand-new and secondhand. Regarding such attributes, words representing each candidate may be registered in a database. For example, "新品" ("brand-new") and "中古" ("secondhand") are registered. The search apparatus of the present invention may be configured so that when a search word corresponds with any one of names of a plurality of words registered in a database, the search word is determined to represent a content of attribute of the division. Specifically, the user can specify a search condition for a state of an item for sale by inputting "新品" or "中古" as a search word.

REFERENCE SIGNS LIST

1 Online shopping mall server
2 Shop terminal
3 User terminal
11 Communication unit
12 Storage unit
12a Member information DB
12b Category information DB
12c Sale item information DB
12d Exclusion specification word DB
12e Unit word DB
12f Range specification word DB
13 Input/output interface
14 System control unit
14a CPU
14b ROM
14c RAM
15 System bus
NW Network
S Shopping system

The invention claimed is:

1. A search apparatus comprising:
at least one memory operable to store program code;
at least one processor operable to read the program code and operate as instructed by the program code, the program code including:
first determination code configured to cause the at least one processor to, for each of a plurality of input words input by a user in one input area in which at least keywords can be input, determine whether or not the input word is a first attribute word representing a content of an attribute of a predetermined first division of a plurality of divisions of attributes had by a search object, said determination including at least one of comparison of said input word to attributes stored in a database storage unit and determination of whether said input word includes a word representing a predetermined unit; and
search code configured to cause the at least one processor to search for a search object by using a content, as a search condition of attribute of the first division, represented by the input word which is determined to be the first attribute word by the first determination code, said search including comparison of said input word determined to be an attribute with a corresponding attribute field of potential search results;
wherein, the database storage unit hierarchically stores the attributes as nodes in a tree structure;
the program code further includes
second determination code configured to cause the at least one processor to determine whether there are two or more sibling attribute words, among the plurality of input words, which are siblings to each other in the tree structure and each of the two or more sibling attribute words corresponds to any one of the attributes stored in the database storage unit, and
generation code configured to cause the at least one processor to combine a search condition corresponding to each of the two or more sibling attribute words and at least one search condition corresponding to at least one input word, among the plurality of input words, other than the two or more sibling attribute words with logical AND to generate a search expression, when it is determined that there are the two or more sibling attribute words,
the search code is further configured to cause the at least one processor to search for search objects meeting each of two or more search expression generated by the generation code to identify a set of search results, and
the program code further includes providing code configured to cause the at least one processor to provide two or more sets of search results identified by the search code in a state where the two or more sets of search results are displayed separately.

2. The search apparatus according to claim 1, wherein
at least one first division is a division of an attribute whose content is a value in a predetermined unit, and
the first determination code is further configured to cause the at least one processor to determine that the input word meeting a minimum requirement that the input word includes a word representing the unit is the first attribute word.

3. The search apparatus according to claim 2, wherein when the input word which is determined to be the first attribute word by the first determination code is further configured to cause the at least one processor to include a representation specifying a range of values, the search code is further configured to cause the at least one processor to search for a search object a value of the attribute of the first division of which is included in the range of values represented by the input word.

4. The search apparatus according to claim 1, wherein at least one of the divisions is a second division in which a content of an attribute is defined as a node in a tree structure and each content is hierarchically defined, the search apparatus further includes second determination code configured to cause the at least one processor to determine each input word whether or not the input word is a second attribute word corresponding to at least one of a plurality of words stored in said database storage unit storing a word representing a content of an attribute of the second division for each content in a tree structure, and decision code configured to cause the at least one processor to, when there is a plurality of input words which are determined to be the second attribute words by the second determination code, decide a method of combining search conditions corresponding to the respective plurality of input words, which are determined to be the second attribute words, on the basis of a positional relationship between the input words in the tree structure, and the search code is further configured to cause the at least one processor to search for a search object on the basis of a search condition obtained by combining search conditions corresponding to the respective plurality of input words, which are determined to be the second attribute words, by the at least one processor caused by the decision code.

5. The search apparatus according to claim 4, wherein when a certain plurality of the input words are siblings to each other, the decision code is further configured to cause the at least one processor to combine search conditions corresponding to the respective certain plurality of input words with each other with logical OR.

6. The search apparatus according to claim 5, wherein the search code is further configured to cause the at least one processor to search for a search object for each of the search conditions corresponding to the respective certain plurality of input words, and the search apparatus further includes a providing code configured to cause the at least one processor to provide search object information indicating search objects found by the search code such that pieces of the search object information is displayed separately for the respective certain plurality of input words.

7. The search apparatus according to claim 4, wherein when a certain input word is an ancestor of at least one other input words in the tree structure, the decision code is further configured to cause the at least one processor deciding to combine a search condition corresponding to the certain input word and a search condition corresponding to the at least the one other input word with logical AND.

8. The search apparatus according to claim 4, wherein the search code is further configured to cause the at least one processor to decide that at least one of the input words which are determined to be the second attribute words by the second determination code is a keyword and decides a condition that character information stored in a character information storage includes the keyword to be a search condition, the character information storage storing character information related to a search object for each search object.

9. The search apparatus according to claim 4, wherein the search code is further configured to cause the at least one processor to use a content represented by at least one of a plurality of the input words which are determined to be the second attribute words by the second determination code as a search condition of attribute of the second division.

10. The search apparatus according to claim 1, wherein by determining whether or not the input word is the first attribute word for each first division, the first determination code is further configured to cause the at least one processor to identify an attribute of the first division whose content is represented by the input word, and the search code is further configured to cause the at least one processor to use the input word for which the attribute of the first division is identified by the first determination code as a search condition of attribute of the first division identified.

11. The search apparatus according to claim 1, wherein when a certain input word includes a representation indicating exclusion, the search code is further configured to cause the at least one processor to use negation of a condition corresponding to the certain input word as a search condition.

12. The search apparatus according to claim 1, wherein the search code is further configured to cause at least one processor to decide that an input word which is not determined to be the first attribute word by the first determination code is a keyword and uses a condition that character information stored in a character information storage includes the keyword as a search condition, the character information storage storing character information related to a search object for each search object.

13. A search method performing by a search apparatus, the search method comprising:

first determination, using the at least one processor, for each of a plurality of input words input by a user in one input area in which at least keywords can be input, determine whether or not the input word is a first attribute word representing a content of an attribute of a predetermined first division of a plurality of divisions of attributes had by a search object, said determination including at least one of comparison of said input word to attributes stored in a database storage unit and determination of whether said input word includes a word representing a predetermined unit; and searching, using the at least one processor, for a search object by using a content, as a search condition of attribute of the first division, represented by the input word which is determined to be the first attribute word by the first determination code, said search including comparison of said input word determined to be an attribute with a corresponding attribute field of potential search results;

wherein, the database storage unit hierarchically stores the attributes as nodes in a tree structure;

second determination, using the at least one processor, to determine whether there are two or more sibling attribute words, among the plurality of input words, which are siblings to each other in the tree structure and each of the two or more sibling attribute words corresponds to any one of the attributes stored in the database storage unit, and combining, using the at least one processor, a search condition corresponding to each of the two or more sibling attribute words and at least one search condition corresponding to at least one input word, among the plurality of input words, other than the two or more sibling attribute words with logical AND to generate a search expression, when it is determined that there are the two or more sibling attribute words, searching, using the at least one processor, for search objects meeting each of two or more search expression generated by the generation code to identify a set of search results, and providing, using the at least one processor, two or more sets of search results identified by the search code in a state where the two or more sets of search results are displayed separately.

\* \* \* \* \*